(12) United States Patent
Griscik et al.

(10) Patent No.: US 11,737,485 B2
(45) Date of Patent: Aug. 29, 2023

(54) SMOKELESS TOBACCO ARTICLE

(71) Applicant: Altria Client Services LLC, Richmond, VA (US)

(72) Inventors: Gregory James Griscik, Midlothian, VA (US); Carl Gregory Miller, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 416 days.

(21) Appl. No.: 17/130,579

(22) Filed: Dec. 22, 2020

(65) Prior Publication Data

US 2021/0106042 A1 Apr. 15, 2021

Related U.S. Application Data

(63) Continuation of application No. 16/395,669, filed on Apr. 26, 2019, now Pat. No. 10,881,130, which is a
(Continued)

(51) Int. Cl.
| | |
|---|---|
| *A24B 3/14* | (2006.01) |
| *A23G 4/06* | (2006.01) |
| *A24B 13/00* | (2006.01) |
| *A24B 15/18* | (2006.01) |
| *A24B 15/30* | (2006.01) |
| *B29C 43/00* | (2006.01) |
| *B29C 43/52* | (2006.01) |
| *B29K 21/00* | (2006.01) |
| *B29K 511/00* | (2006.01) |
| *B29L 31/00* | (2006.01) |

(52) U.S. Cl.
CPC ............... *A24B 3/14* (2013.01); *A23G 4/068* (2013.01); *A24B 13/00* (2013.01); *A24B 15/18* (2013.01); *A24B 15/30* (2013.01); *B29C 43/003* (2013.01); *B29C 43/006* (2013.01); *B29C 43/52* (2013.01); *B29K 2021/003* (2013.01); *B29K 2511/00* (2013.01); *B29L 2031/7414* (2013.01)

(58) Field of Classification Search
None
See application file for complete search history.

(56) References Cited

U.S. PATENT DOCUMENTS

| | | | |
|---|---|---|---|
| 4,375,441 | A | 3/1983 | Adams et al. |
| 4,516,590 | A | 5/1985 | Teng |

(Continued)

OTHER PUBLICATIONS

International Preliminary Report on Patentability in International Application No. PCT/US2014/023439, dated Sep. 24, 2015, 8 pages.

(Continued)

*Primary Examiner* — Dennis R Cordray
(74) *Attorney, Agent, or Firm* — Harness, Dickey & Pierce, P.L.C.

(57) ABSTRACT

A method for making a smokeless tobacco article can include combining thermoplastic polymer particles with tobacco particles to form a mixture of particles, compressing the mixture of particles within a pressing apparatus to form the mixture into a predetermined shape, separating the mixture from the pressing apparatus such that it retains the predetermined shape, and heating the mixture outside of the pressing apparatus to at least partially melt at least some of the thermoplastic polymer particles and form a matrix of polymer and tobacco particles.

20 Claims, 20 Drawing Sheets

Related U.S. Application Data continuation of application No. 15/194,912, filed on Jun. 28, 2016, now Pat. No. 10,271,572, which is a continuation of application No. 14/204,530, filed on Mar. 11, 2014, now Pat. No. 9,402,414.

(60) Provisional application No. 61/786,252, filed on Mar. 14, 2013.

(56) References Cited

U.S. PATENT DOCUMENTS

| | | |
|---|---|---|
| 4,528,993 A | 7/1985 | Sensabaugh, Jr. et al. |
| 4,660,577 A | 4/1987 | Sensabaugh et al. |
| 4,848,373 A | 7/1989 | Lenkey |
| 4,987,907 A | 1/1991 | Townend |
| 5,372,149 A | 12/1994 | Roth et al. |
| 7,694,686 B2 | 4/2010 | Atchley et al. |
| 8,168,855 B2 | 5/2012 | Nielsen et al. |
| 8,469,036 B2 | 6/2013 | Williams et al. |
| 2004/0118422 A1 | 6/2004 | Lundin et al. |
| 2006/0191548 A1 | 8/2006 | Strickland et al. |
| 2009/0032040 A1 | 2/2009 | Luzenberg, Jr. |
| 2009/0293889 A1 | 12/2009 | Kumar et al. |
| 2010/0163062 A1 | 7/2010 | Atchley et al. |
| 2010/0170522 A1 | 7/2010 | Sun et al. |
| 2010/0275936 A1 | 11/2010 | Bivehed |
| 2013/0186416 A1 | 7/2013 | Gao et al. |
| 2013/0186419 A1 | 7/2013 | Gao et al. |

OTHER PUBLICATIONS

International Search Report and Written Opinion in International Application No. PCT/US2014/023439, dated Jun. 20, 2014, 12 pages.

Tso, "Seed to Smoke," Tobacco, Production, Chemistry and Technology, Davis & Nielsen, eds., 1999, chapter 1, 33 pages.

Definition of "absorption", Hawley's Condensed Chemical Dictionary, 14th Ed., 2002, John Wiley & Sons, Inc.

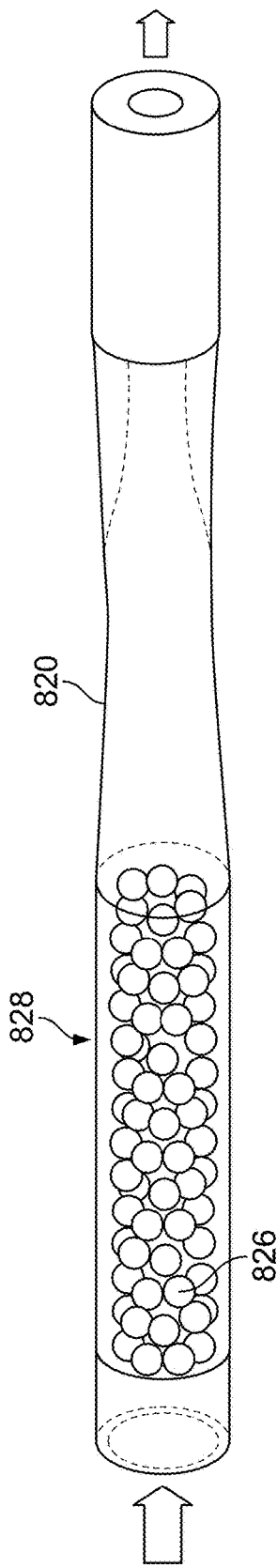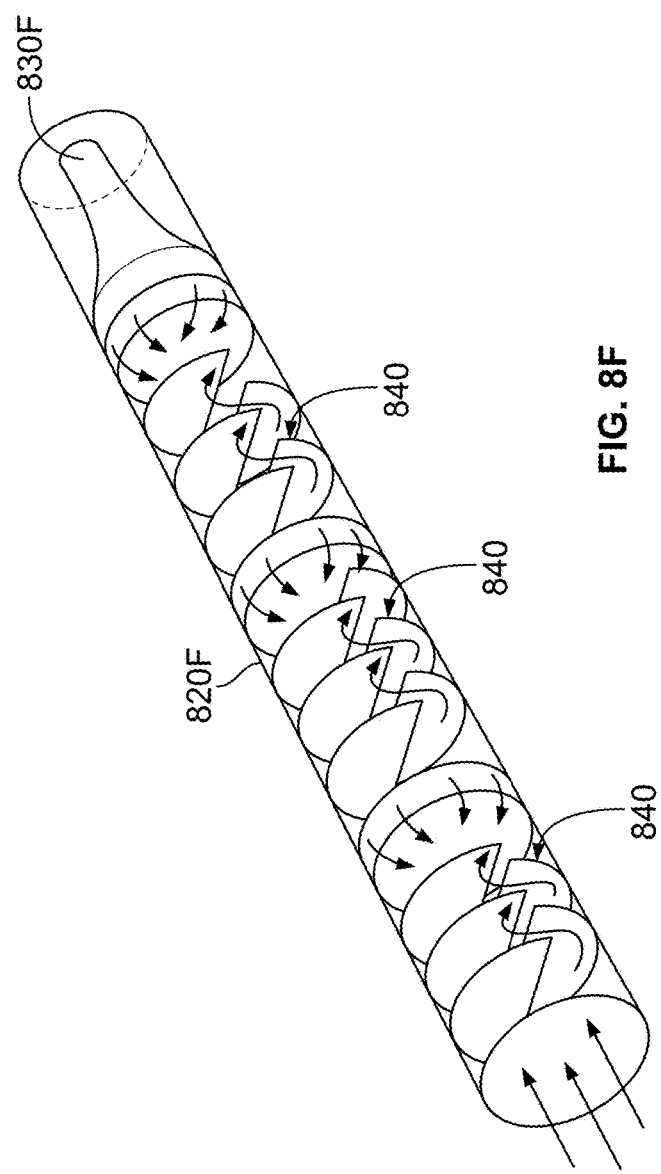

SMOKELESS TOBACCO ARTICLE

CROSS REFERENCE TO RELATED APPLICATIONS

This Application is a continuation of U.S. application Ser. No. 16/395,669, filed on Apr. 26, 2019, which is a continuation of U.S. application Ser. No. 15/194,912, filed Jun. 28, 2016, which is a continuation of U.S. application Ser. No. 14/204,530, filed on Mar. 11, 2014, which claims the benefit of priority under 35 U.S.C. § 119(e) to U.S. Application No. 61/786,252 filed Mar. 14, 2013, the entire contents of each of which are incorporated herein by reference.

TECHNICAL FIELD

This document relates to tobacco products and methods for making smokeless tobacco articles.

BACKGROUND

Tobacco compositions are available to adult tobacco consumers in a variety of forms. Smoking tobacco is combusted and the aerosol either tasted or inhaled (e.g., in a cigarette, cigar, or pipe). Smokeless tobacco articles are not combusted and include: chewing tobacco, moist smokeless tobacco, snus, and dry snuff. Chewing tobacco is coarsely divided tobacco leaf that is typically packaged in a large pouch-like package and used in a plug or twist. Moist smokeless tobacco is a moist, more finely divided tobacco that is provided in loose form or in pouch form and is typically packaged in round cans and used as a pinch or in a pouch placed between a cheek and gum of an adult tobacco consumer. Snus is a heat treated smokeless tobacco. Dry snuff is finely ground tobacco that is placed in the mouth or used nasally.

SUMMARY

Methods for forming smokeless tobacco articles and the resulting smokeless tobacco articles are provided herein. Methods provided herein can include combining thermoplastic polymer particles with tobacco particles to form a mixture of particles, compressing the mixture of particles within a pressing apparatus to form the mixture into a predetermined shape, releasing pressure on the mixture such that the mixture retains the predetermined shape, and heating the mixture to at least partially melt at least some of the thermoplastic polymer particles and form a matrix of polymer and tobacco particles. In some cases, a compressed mixture of particles having the predetermined shape is ejected from the pressing apparatus prior to heating the mixture having the predetermined shape. The heating of the mixture having a predetermined shape can take place in a convection oven. A resulting smokeless tobacco article can have a soft mouth feel and provide an adult tobacco consumer a satisfying tactile and/or flavor experience. The methods provided herein can yield high production speed for each pressing cavity. The smokeless tobacco article can include a body that is at least partially receivable in an oral cavity of an adult tobacco consumer. In some cases, cellulosic fibers can be included in the smokeless tobacco article. In some cases, a combination of cellulosic fibers and one or more tobacco organoleptic compounds can be included in the smokeless tobacco article in addition to or in place of tobacco particles.

Smokeless tobacco articles provided herein can each optionally include one or more of the following features. A smokeless tobacco article body provided herein can have a Shore M durometer of at least 89 (e.g., at least 90, at least 91, or at least 92). The amount of compression, the heating time, and the heating temperature can all impact the Shore M hardness. In some cases, the mixture of particles is compressed with at least 4 kN (e.g., at least 5 kN, at least 6 kN, at least 7 kN, or at least 8 kN). In some cases, the compressed mixture of particles having a predetermined shape is heated in an oven having a temperature less than 20° C. greater than the melting temperature of the thermoplastic polymer. In some cases, the oven can have a temperature that is less than 15° C. greater than the melting temperature of the thermoplastic polymer, less than 10° C. greater than the melting temperature of the thermoplastic polymer, or less than 5° C. greater than the melting temperature of the thermoplastic polymer. For example, a ultrahigh molecular weight polyethylene (UHMWPE) polymer can have a melting temperature of about 144° C. and an oven used to heat a mixture including UHMWPE particles can have an internal temperature of about 150° C. In some cases, UHMWPE polymer is exposed to a temperature of 150° C. or less for between 20 minutes and 30 minutes. The compressed mixture of particles having a predetermined shape can be heated for a time period of between 5 minutes and 1 hour (e.g., between 10 minutes and 50 minutes, between 15 minutes and 45 minutes, between 20 minutes and 40 minutes, or between 25 minutes and 35 minutes).

A smokeless tobacco article body provided herein can include at least 30 weight percent of a thermoplastic polymer (e.g., at least 50 weight percent thermoplastic polymer, at least 55 weight percent thermoplastic polymer, at least 60 weight percent thermoplastic polymer, at least 65 weight percent thermoplastic polymer, or at least 70 weight percent thermoplastic polymer). A smokeless tobacco article body provided herein can include up to 90 weight percent of a thermoplastic polymer (e.g., up to 80 weight percent thermoplastic polymer, up to 70 weight percent thermoplastic polymer, up to 60 weight percent thermoplastic polymer, up to 50 weight thermoplastic polymer, or up to 40 weight percent thermoplastic polymer). In some cases, the smokeless tobacco article can include between 50 weight percent and 70 weight percent thermoplastic polymer.

The thermoplastic polymer can be a mouth-stable polymer. The mouth-stable polymer matrix can include polyethylene, polypropylene, polyurethane, silicon polymer, polyester, polyacrylate, polyethylene, poly(styrene-ethylene-butylene-styrene) ("SEBS"), poly(styrene-butadiene-styrene) ("SBS"), and other similar thermoplastic elastomers, or any copolymer, mixture, or combination thereof. The smokeless tobacco article can also include a plasticizer dispersed in the mouth-stable polymer matrix. For example, the plasticizer can be propylene glycol, glycerin, vegetable oil, triglycerides, or a combination thereof. The smokeless tobacco article can also include a sweetener dispersed in the body. The sweetener can be saccharine, sucralose, aspartame, acesulfame potassium, or a combination thereof.

Methods provided herein can include mixing thermoplastic polymer particles with tobacco and compressing the mixture. Thermoplastic polymer particles used in a method provided herein can have a particle size of less than 500 µm (e.g., less than 250 µm, less than 100 µm, less than 75 µm, less than 50 µm, less than 25 µm, less than 10 µm, less than 5 µm, or less than 1 µm). Thermoplastic polymer particles used in a method provided herein can have a particle size of at least 0.1 µm (e.g., at least 0.5 µm, at least 1 µm, at least 5 µm, at least 10 µm, at least 25 µm, at least 50 µm, at least 75 µm, or at least 100 µm). For example, the thermoplastic polymer particles can have an average particle size of between about 1 µm and 100 µm.

Smokeless tobacco articles provided herein can include one or more additives. For example, a smokeless tobacco article provided herein can include an additive selected from the group consisting of minerals, vitamins, dietary supplements, nutraceuticals, energizing agents, soothing agents, amino acids, chemesthic agents, antioxidants, botanicals, teeth whitening agents, therapeutic agents, or a combination thereof.

A smokeless tobacco article body provided herein can have at least 10 weight percent smokeless tobacco. A smokeless tobacco article body provided herein includes at least 10 weight percent of a smokeless tobacco (e.g., at least 20 weight percent smokeless tobacco, at least 30 weight percent smokeless tobacco, at least 40 weight percent smokeless tobacco, at least 50 weight percent smokeless tobacco, or at least 60 weight percent smokeless tobacco). A smokeless tobacco article body provided herein can include up to 70 weight percent of a smokeless tobacco (e.g., up to 60 weight percent smokeless tobacco, up to 50 weight percent smokeless tobacco, up to 40 weight percent smokeless tobacco, up to 30 weight thermoplastic polymer, or up to 20 weight percent smokeless tobacco). In some cases, the smokeless tobacco article can include between 30 weight percent and 50 weight percent smokeless tobacco. In some cases, the smokeless tobacco can have an average diameter of between 40 microns to 710 microns. In some cases, a smokeless tobacco article provided herein can include non-tobacco cellulosic fibers. For example, the cellulosic fibers can be selected from the following: sugar beet fiber, wood pulp fiber, cotton fiber, bran fiber, citrus pulp fiber, grass fiber, willow fiber, poplar fiber, and combinations thereof. The non-tobacco cellulosic fibers may also be chemically treated prior to use. For example, the non-tobacco cellulosic fibers can be CMC, HPMC, HPC, or other treated cellulosic material. In some cases, other additives (e.g., binders) can be used to assist the piece in maintaining its shape when removed from the press mold cavity prior to sintering.

A smokeless tobacco article provided herein can include flavorants. The flavorants can be natural or artificial. Flavorants can be selected from the following: licorice, wintergreen, cherry and berry type flavorants, Drambuie, bourbon, scotch, whiskey, spearmint, peppermint, lavender, cinnamon, cardamon, apium graveolents, clove, cascarilla, nutmeg, sandalwood, bergamot, geranium, honey essence, rose oil, vanilla, lemon oil, orange oil, Japanese mint, cassia, caraway, cognac, jasmin, chamomile, menthol, ylangylang, sage, fennel, piment, ginger, anise, coriander, coffee, mint oils from a species of the genus Mentha, cocoa, and combinations thereof. Synthetic flavorants can also be used. The particular combination of flavorants can be selected from the flavorants that are generally recognized as safe ("GRAS") in a particular country, such as the United States. Flavorants can also be included in the smokeless tobacco article as encapsulated flavorants.

The body of the smokeless tobacco article can have a variety of different shapes, some of which include disk, shield, rectangle, triangle, oval and square. In some cases, the body can have a length or width of between 5 mm and 25 mm and a thickness of between 1 mm and 10 mm.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 8A-8J illustrate smokeless tobacco articles having various rod, stick, or tube configurations.

DETAILED DESCRIPTION

Figure 1:
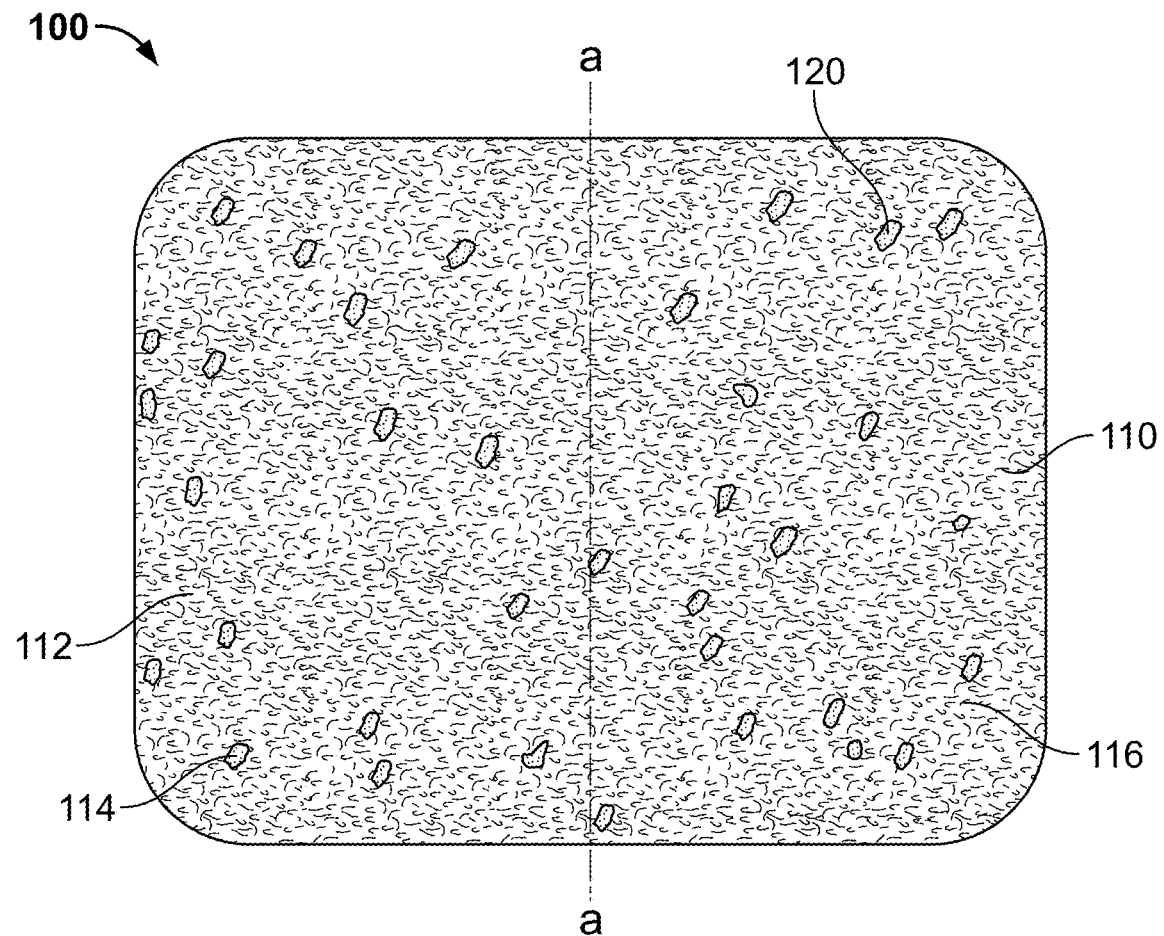
FIG. 1 is a cross-sectional view of a smokeless tobacco article provided herein.

This document provides materials and methods for making smokeless tobacco articles in which a combination of tobacco particles and plastic polymer particles are combined, compressed, and heated to form a smokeless tobacco article. The resulting smokeless tobacco article can provide an adult tobacco consumer with a good mouth feel and a pleasing flavor. Smokeless tobacco articles provided herein can be less expensive to manufacture than traditional pouch smokeless tobacco articles, and can have a longer shelf life because they are substantially dry, rather than wet or moist. For example, a smokeless tobacco article provided herein can have an extended shelf life (e.g., 30 weeks or more). The methods provided herein can allow for a high throughput per compression cavity.

Smokeless tobacco articles provided herein can include a porous matrix formed from particles of a thermoplastic polymer and tobacco dispersed within the pores of the porous matrix. Smokeless tobacco articles provided herein can include air spaces between the polymer and the tobacco. The size of the polymer particles can affect the size of the pores that result from the processes provided herein, such that larger particles typically result in larger pores, and smaller particles result in smaller pores. Larger pores can result in faster desorption of tobacco and tobacco components from an article, while smaller pores can result in slower desorption. The rate of tobacco desorption thus can be moderated based on the pore size. Various sizes of polymer particles can be used. For example, smokeless tobacco articles provided herein can be made from polymer particles having an average diameter of about 1 microns to about 100 microns (e.g., about 1 micron, about 5 microns, about 10 microns, about 20 microns, about 30 microns, about 40 microns, about 50 microns, about 60 microns, about 70 microns, about 80 microns, about 90 microns, or about 100 microns), or any range in between, including, without limitation, about 1 to about 10 microns, about 10 microns to about 20 microns, about 15 microns to about 25 microns, about 20 microns to about 30 microns, about 30 microns to about 40 microns, about 40 microns to about 50 microns, about 50 microns to about 60 microns, about 60 microns to about 80 microns, or about 80 microns to about 100 microns. Smokeless tobacco articles provided herein can have average void diameters of about 1 to about 50 microns, or any range in between, including, without limitation, about 1 microns to about 5 microns, about 3 microns to about 15 microns, about 10 microns to about 20 microns, about 20 microns to about 30 microns, about 30 microns to about 40 microns, or about 40 microns to about 50 microns. Smokeless tobacco articles provided herein can have different regions with different average pore sizes. For example, the resulting smokeless tobacco article can have a gradient of average pore sizes from a surface having a smaller average pores size to a central portion having a larger average pore size. Average pore sizes can be measured by taking a cross-section of the article and measuring, with a microscope, the largest dimension of each observable pore between fused polymer particles and averaging the observed largest dimensions. The resulting void volume can also depend upon the dimensions of the fused polymer particles. In some cases, smokeless tobacco articles provided herein can have different regions having different void volumes. For example, the resulting article can have a gradient of void volume from a surface having a smaller void volume to a central portion having a larger void volume.

The polymer particles can include regularly and irregularly sized and shaped particles. In some cases, the polymer particles can be substantially spherical (e.g., round beads). In some cases, irregularly shaped polymer granules of various sizes can be used. In some cases, the polymer particles can include flakes, cylindrical beads, films with different cut lengths, polymer shavings, chunks, and polymer fibers cut to various lengths. The shape of the polymer particles can impact the average pore sizes, the pore size distribution, and the void volume.

A number of materials are suitable for the porous matrix of a smokeless tobacco article provided herein. For example, a porous matrix can comprise a porous, insoluble thermoplastic such as polyethylene. Ultra-high molecular weight polyethylene can be particularly useful because, for example, the particle size of ultra-high molecular weight polyethylene beads can be readily controlled. In addition, the use of ultra-high molecular weight polyethylene can result in a particularly smooth product, which can feel malleable in the mouth of a consumer.

A porous matrix additionally or alternatively can include one or more of the following polymer materials: acetals, acrylics such as polymethylmethacrylate and polyacrylonitrile, alkyds, polymer alloys, allyls such as diallyl phthalate and diallyl isophthalate, amines such as urea, formaldehyde, and melamine formaldehyde, cellulosics such as cellulose acetate, cellulose triacetate, cellulose nitrate, ethyl cellulose, cellulose acetate propionate, cellulose acetate butyrate, hydroxypropyl cellulose, cellophane and rayon, chlorinated polyether, coumarone-indene, epoxy, fluorocarbons such as PTFE, FEP, PFA, PCTFE, ECTFE, ETFE, PVDF, and PVF, furan, hydrocarbon resins, nitrile resins, polyaryl ether, polyaryl sulfone, phenol-aralkyl, phenolic, polyamide (nylon), poly (amide-imide), polyaryl ether, polycarbonate, polyesters such as aromatic polyesters, thermoplastic polyester, PBT, PTMT, PET and unsaturated polyesters such as SMC and BMC, polyimides such as thermoplastic polyimide and thermoset polyimide, polymethyl pentene, polyolefins such as LDPE, LLDPE, and HDPE, polypropylene, inomers such as PD and poly allomers, polyphenylene oxide, polyphenylene sulfide, polyurethanes, poly p-xylylene, silicones such as silicone fluids and elastomers, rigid silicones, styrenes such as PS, ADS, SAN, styrene butadiene lattices, and styrene based polymers, sulfones such as polysulfone, polyether sulfone and polyphenyl sulfones, thermoplastic elastomers, and vinyls such as PVC, polyvinyl acetate, polyvinylidene chloride, polyvinyl alcohol, polyvinyl butyrate, polyvinyl formal, propylene-vinyl chloride copolymer, ethylvinyl acetate, and polyvinyl carbazole. In addition, the polymer or polymers from which a porous matrix is made can be colored, resulting in a colored smokeless tobacco article.

The tobacco particles contained in the smokeless tobacco articles provided herein can be granulated, powdered, flaked, shredded, cut (e.g., long cut tobacco), cured, aged, fermented, heat treated, pasteurized, encapsulated, or otherwise processed. Powdered, granulated, or flaked tobacco can be particularly useful. For example, tobacco can be in a granulated or powdered form so that it is sized to fit within the pores of a porous matrix. In some cases, some or all of the tobacco in a smokeless tobacco article can be processed from reconstituted tobacco. In some cases, the tobacco can be long cut tobacco having a length of about 0.25 inches to 1 inch and a width of between 0.005 inches to 0.05 inches. For example, tobacco can include between 35 cuts per inch. In some cases, long cut tobacco can be retained in a central portion of the article and a peripheral portion of the article can be substantially free of the long cut tobacco. In some cases, the article can include different combinations of different shaped of tobacco, optionally in different portions of the article. For example, a smokeless tobacco article having a central portion including long cut tobacco can also include powdered tobacco in other portions of the smokeless tobacco article, for example in peripheral portion of the article having a smaller average pore size than the central portion. Having an exterior portion of the smokeless tobacco article having a smaller average pore size can also prevent the migration of larger tobacco pieces in a central portion of the article from migrating out of the polymer matrix.

Tobacco particles can be separated into different size ranges using methods known in the art, including mesh screening, for example. Further, a variety of sizes of tobacco particle can be used in the articles provided herein. For example, a smokeless tobacco article can comprise tobacco granules, powder, or flakes having an average tobacco particle diameter or width of about 20 microns to about 100 microns (e.g., about 20 microns, about 30 microns, about 40 microns, about 50 microns, about 60 microns, about 70 microns, about 80 microns, about 90 microns, or about 100 microns), or any range in between (e.g., about 20 microns to about 40 microns, about 40 microns to about 60 microns, or about 60 microns to about 100 microns). Tobacco particles having an average diameter or width of about 40 microns to about 60 microns can be particularly useful, as such particles can be readily obtained and can result in a tobacco product having a smooth, non-gritty texture. Where a grittier texture is desired, particles having an average diameter of about 60 microns to about 100 microns can be used. The size of tobacco particles can be modified based on a milling process (e.g., hammer milling). The different types of tobacco used in the smokeless tobacco articles provided herein are discussed in further detail below.

Figure 2A:
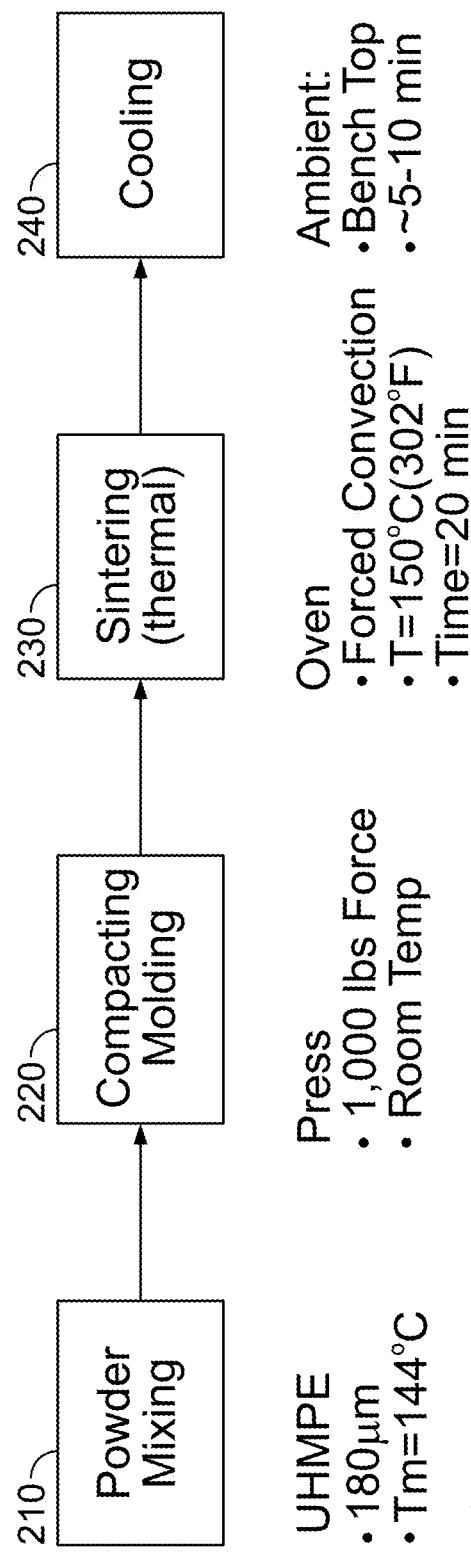
FIGS. 2A-2E illustrate methods of making smokeless tobacco articles provided herein.
Figure 2B:
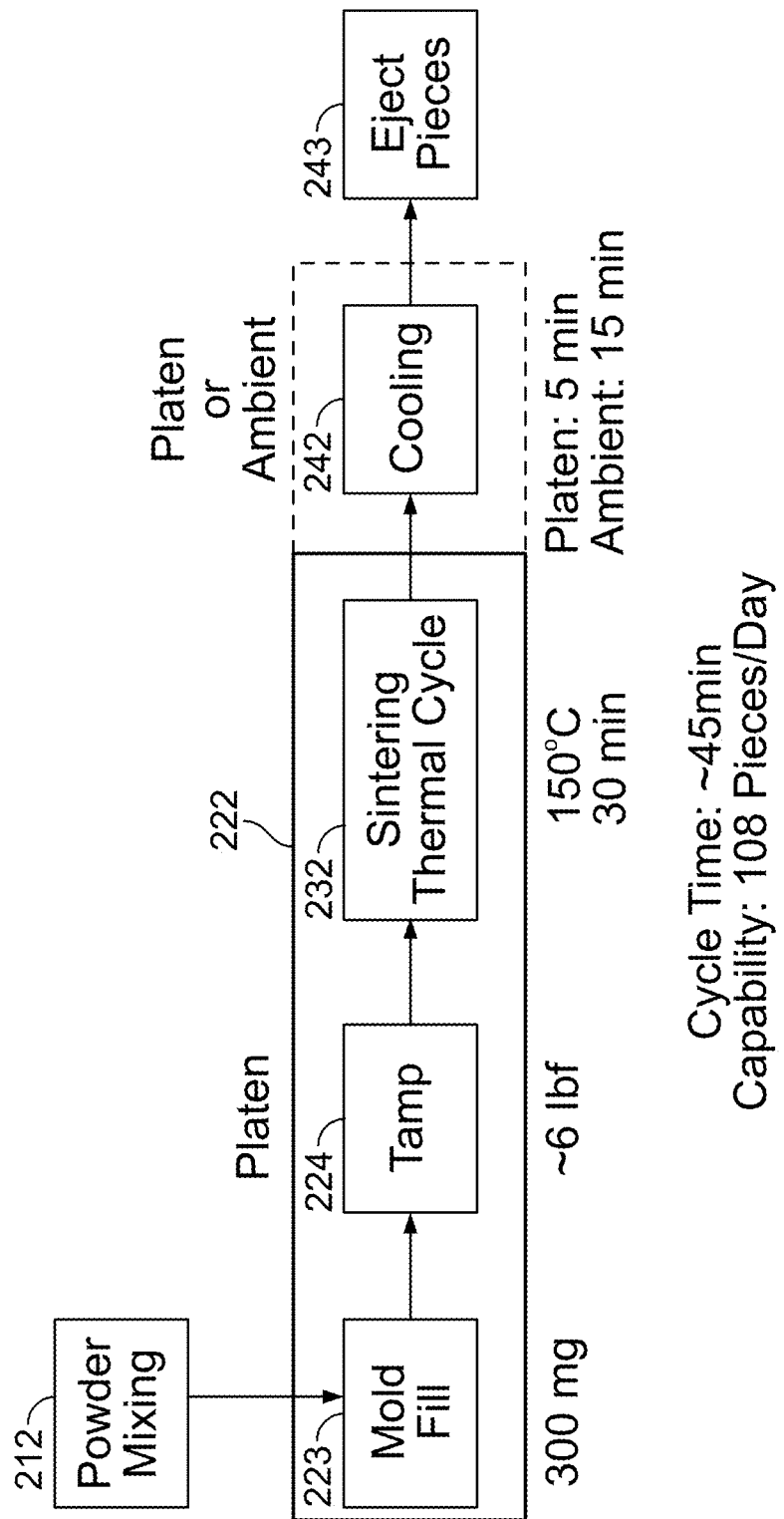
Figure 2C:
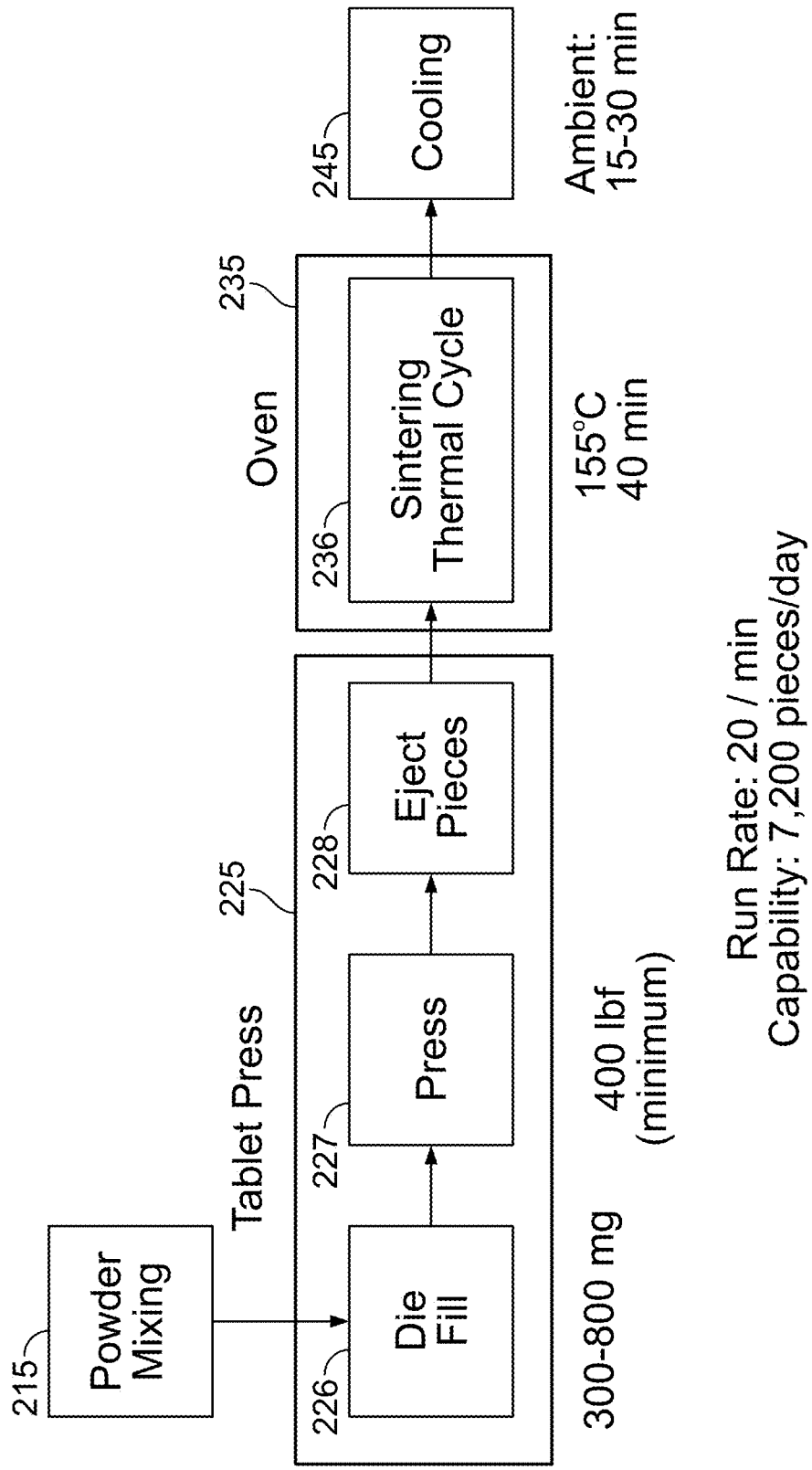

Tobacco (e.g., granulated, powdered, flaked tobacco particles, or long cut tobacco) can be combined with polymer material at a selected ratio, and the mixture can then be used in molding processes (as described, for example, in connection with FIGS. 2A, 2B, and 2C). Typically, the products provided herein contain from about 30% to about 60% tobacco by weight, such that the ratio of tobacco:polymer ranges from about 30:70 to about 60:40 (e.g., about 40:60, about 45:55, or about 50:50). Alternatively, the tobacco products provided herein can contain from about 20% to about 80% tobacco by weight, such that the ratio of tobacco:polymer ranges from about 20:80 to about 70:30 (e.g., about 20:80, about 45:55, about 50:50, about 60:40, or about 70:30). A ratio of tobacco:polymer that is relatively low may result in a product that is perceived to be hard, while a ratio that is relatively high may result in loss of structural integrity, and can result in a product that is perceived to be soft.

The sizes of the tobacco particles and the polymer particles relative to one another can be varied. Typically, however, when relatively large tobacco particles (e.g., 60 microns to 100 microns in diameter, on average) are used, bigger polymer particles can be used so that the resulting product has sufficient structural integrity. When relatively small tobacco particles (e.g., 40 microns to 60 microns in diameter, on average) are used, smaller polymer particles (e.g., 10 microns to 20 microns in diameter, on average) also can be used. The size of the tobacco and polymer particles can affect the texture of the resulting smokeless tobacco article. For example, smaller particles can result in a smoother product, while larger particles can give a rougher or grittier product. Thus, the smokeless tobacco articles provided herein can be manufactured to a variety of texture profiles.

The smokeless tobacco articles provided herein can have a variety of shapes (e.g., rectangular, square, spherical, cylindrical, rod shaped article being comfortable for placement in a mouth of an adult tobacco consumer). In some cases, a smokeless tobacco article can be adapted to be wholly received by an adult consumer. Such smokeless tobacco articles can be configured to nearly unlimited forms. For example, smokeless tobacco articles provided herein can be configured to resemble a tobacco pouch, and can have a generally elliptical shape, but other embodiments can have a pillow shape, a boat-like shape, a circular shape, a flat rectangular shape, or the like. Further, smokeless tobacco articles provided herein can be formed or molded over a non-disintegratable substrate.

The article can also include accumulated granules of tobacco powder, sugars, starches, and/or flavors. Tobacco containing accumulated granules can be included in the article as the tobacco or along with other tobacco. For example, U.S. patent application Ser. No. 12/641,915, filed Dec. 18, 2009, entitled "Tobacco Granules and Method of Producing Tobacco Granules," which is hereby incorporated by reference, describes accumulated granules including tobacco particles. The granules can include a core and one or more layers surrounding the core that includes tobacco particles and a binder. In some cases, the accumulated granules can be coated with a polymer and used in the methods provided herein as the polymer particles, either without additional solid polymer particles or with additional solid polymer particles making up the polymer matrix. In some cases, the accumulated granules can be fully encapsulated by the polymer. In some cases, the accumulated granules can include an incomplete coating that allows for tobacco, flavors, and/or other constituents to migrate though the network of pores in the article. During use, flavors and/or tobacco constituents of the accumulated granules can elute though the porous network of the article to be released into a mouth of an adult tobacco consumer. In some cases, mastication of the article can result in the release of flavorants from encapsulated accumulated granules within the smokeless tobacco article. Accumulated granules, such as the tobacco granules described in U.S. patent application Ser. No. 12/641,915, can be coated with polymer according to known techniques in the art, including painting, sputtering, and drum coating processes.

Turning now to the Figures, smokeless tobacco article 100 as depicted in FIG. 1 can include porous matrix 110, with tobacco particles 120 disposed in pores 112 of porous matrix 110 so that smokeless tobacco article 100 can provide, for example, tobacco to an adult consumer. As described herein, smokeless tobacco article 100 can furnish tobacco satisfaction to the adult tobacco consumer.

Smokeless tobacco article 100 can be a noncombustible product, insofar as article 100 does not require ignition during use. Smokeless tobacco article 100 can provide tobacco to a consumer without combusting any part of smokeless tobacco article 100, and without igniting tobacco 120 inside article 100. Rather, the noncombusted tobacco can be provided to the consumer to provide tobacco satisfaction in the form of an experience associated with tobacco components, organoleptic components, and added flavor components that are released upon usage. Such organoleptic components can relate or contribute to the integrated sensory perception by the consumer that includes, for example, any combination of aroma, fragrance, flavor, taste, odor, mouth feel, or the like.

Suitable mouth-stable polymers include thermoplastic elastomers such as polyethylene and/or polyurethane. As used here, the term "mouth stable" means that the polymer does not appreciably dissolve or disintegrate when exposed to saliva within an oral cavity and at the normal human body temperature (e.g., about 98.6° F.) over a period of one hour. In addition to biostable polymers, mouth-stable polymers can include biodegradable polymers that breakdown over periods of days, weeks, months, and/or years, but do not appreciably break down when held in an oral cavity and exposed to saliva for a period of one hour. In some cases, the mouth-stable polymer is stable within an oral cavity and exposed to saliva at the normal human body temperature for a period of at least 6 hours, at least 12 hours, at least 24 hours, or at least 2 days. Accordingly, the smokeless tobacco articles provided herein can remain intact when placed within an oral cavity during a use period. After use, the mouth-stable polymer matrix can be removed from the oral cavity and discarded.

One or more additives can be included in the smokeless tobacco article and adapted to be released from the smokeless tobacco article when the smokeless tobacco article is placed in an oral cavity of adult tobacco consumer. The smokeless tobacco articles provided herein can include added nicotine and/or other additives. During use, saliva can be absorbed into the polymer matrix to release the tobacco constituents. Mechanical action (e.g., chewing) of the smokeless tobacco article can facilitate the release of the additives, sweeteners, and/or flavorants.

In addition to additives, sweeteners, and flavorants, the smokeless tobacco article can also include fillers, plasticizers, and/or processing aids. Fillers can also be included in the mouth-stable polymer matrix to alter the texture or pliability of the smokeless tobacco article. The mouth-stable polymer matrix can also include plasticizers, which can increase the softness of the smokeless tobacco article. Non-tobacco cellulosic fibers can also be included to alter the properties of the smokeless tobacco article. Processing aids can also be present in the smokeless tobacco article.

Producing a Smokeless Tobacco Article

FIGS. 2A-2C illustrate methods of making smokeless tobacco articles provided herein. A method for making a smokeless tobacco article provided herein can include combining thermoplastic polymer particles with tobacco particles to form a mixture of particles, compressing the mixture of particles within a pressing apparatus to form the mixture into a predetermined shape, releasing pressure on the mixture such that the mixture retains the predetermined shape, and heating the mixture to at least partially melt at least some of the thermoplastic polymer particles and form a matrix of polymer and tobacco particles. In some cases, the mixture having the predetermined shape is removed from the pressing apparatus prior to being heated.

The compression of the mixture can take place in a mold, such as that described below in reference to FIG. 3. For example, the mold shown in FIG. 3 can be used in the process diagrammed in FIG. 2A. The amount of compression can impact the final properties of the smokeless tobacco article. In some cases, the mixture is compressed with a force of at least 4 kN (e.g., at least 5 kN, at least 6 kN, at least 7 kN, or at least 8 kN). In some cases, the mixture is compressed with a force of between 4 kN and 15 kN (e.g., between 5 kN and 10 kN, between 6 kN and 9 kN, or between 7.5 kN and 8.5 kN). The mixture can be compressed at a temperature that is below the melting temperature of the polymer particles. In some cases, the temperature in the pressing apparatus can be less than 100° C. (e.g., less than 80° C., less than 70° C., less than 60° C., less that 50° C., less than 40° C., or less than 30° C. In some cases, the temperature in the pressing apparatus during the process of compressing the mixture is approximately room temperature (between about 20° C. and about 25° C.). The compression of the mixture into the predetermined shape can take less than 1 minute (e.g., less than 30 seconds, less than 15 seconds, less than 10 seconds, less than 5 seconds, or less than 3 seconds). In some cases, a pressing apparatus can compress at least 5 units per minutes (e.g., at least 10 units per minute, at least 15 units per minute, or at least 20 units per minutes) for each pressing cavity.

After a mixture of particles is compressed into a predetermined shape, pressure is released in the cavity of the pressing apparatus. In some cases, each compressed mixture is ejected from the pressing cavity and sent to an oven. The compressed mixture retains its predetermined shape during ejection and transport to the oven. The oven can be a convection oven heated to a temperature above the melting temperature of the polymer particles in the compressed mixture. In some case, the oven has an internal temperature of less than 20° C. (e.g., less than 15° C., less than 10° C., or less than 5° C.) greater than the melting temperature of the polymer particles in the compressed mixture. Each compressed mixture can be placed in the oven for between 5 minutes and 1 hour (e.g., between 10 minutes and 50 minutes, between 15 minutes and 45 minutes, between 20 minutes and 40 minutes, or between 25 minutes and 35 minutes). The time in the oven and the temperature of the oven can impact the Shore M hardness, as discussed below in reference to FIG. 9.

Referring specifically to FIG. 2A, a smokeless tobacco article can be made using a mixture of UHMWPE (ultra-high molecular weight polyethylene) having a particle size of about 180 μm. The UHMWPE can have a melting temperature of about 144° C. The tobacco can be powdered tobacco that passes through a 400 mesh. The polymer powder and the tobacco powder are mixed in a powder mixing process 210. In some cases, the weight ratio of polymer to tobacco is between 1:1 and 5:1. In some cases, the weight ratio of polymer to tobacco is about 2:1. The mixture of polymer powder and tobacco is then compact molded in step 220 at a force of greater than about 1 kN. For example, it can be compacted at about 1,000 lbs. (i.e., about 4.45 kN) at room temperature (i.e., between about 20° C. and 25° C.). The compact molding process compresses the mixture of particles such that the mixture retains a predetermined shape. This can take about 1 to about 5 seconds. The predetermined shape and the compact molding apparatus are then placed in an oven for a thermal treatment in step 230. The oven can be operated at atmospheric pressure. The oven can have forced convection and have an internal oven temperature of about 150° C. The predetermined shape can be heated for about 20 minutes and then cooled at room temperature in step 240 for about 5 to 10 minutes to form a smokeless tobacco article having tobacco within a porous matrix of UHMWPE.

FIG. 2B depicts an arrangement where a powder mixture is heated in the pressing apparatus (e.g., the platen). As shown in FIG. 2B, the polymer powder and the tobacco are mixed in step 212 and delivered to a pressing apparatus 222 (e.g., the platen). In step 223, the mold cavity is filled with 300 mg of the mixture. The mixture is then tamped at about 6 lbs. force and heated at about 150° C. for about 30 minutes in step 232 in the pressing apparatus 222. The mixture can then be cooled in step 242 and ejected in step 243. In some cases, the mixture is cooled inside of the pressing apparatus 222 for about 5 minutes prior to ejection. In some cases, the mixture is ejected and then cooled for about 15 minutes under ambient conditions. As shown, this process can have a cycle time of about 45 minutes per piece in the pressing apparatus and thus yield about 108 pieces per day for a pressing apparatus having 6 pressing cavities.

FIG. 2C depicts an arrangement where the powder mixture is ejected from the pressing apparatus 225 (e.g., the tablet press) and heated in an oven 235. As shown in FIG. 2C, the polymer powder and the tobacco are mixed in step 215 and delivered to a pressing apparatus 225 (e.g., the tablet press). In step 226, the mold cavity is filled with 300-800 mg of the mixture. The mixture is then pressed at about 400 lbs. force (i.e., about 1.78 kN) to form the mixture into a predetermined shape. The mixture can then be ejected from the mold cavity in step 228 having a predetermined shape. The piece having a predetermined shape can then be conveyed to oven 235 for a thermal cycle 236. The oven can have a temperature of about 155° C. and the pieces having the predetermined shape can stay in the oven for about 40 minutes. The pieces can then be cooled in step 245 under ambient conditions for 15-30 minutes. Under the process depicted in FIG. 2C, the pressing apparatus 225 can produce about 20 pieces per minute, thus a single pressing apparatus can produce about 7,200 pieces per shift.

Figure 2D:
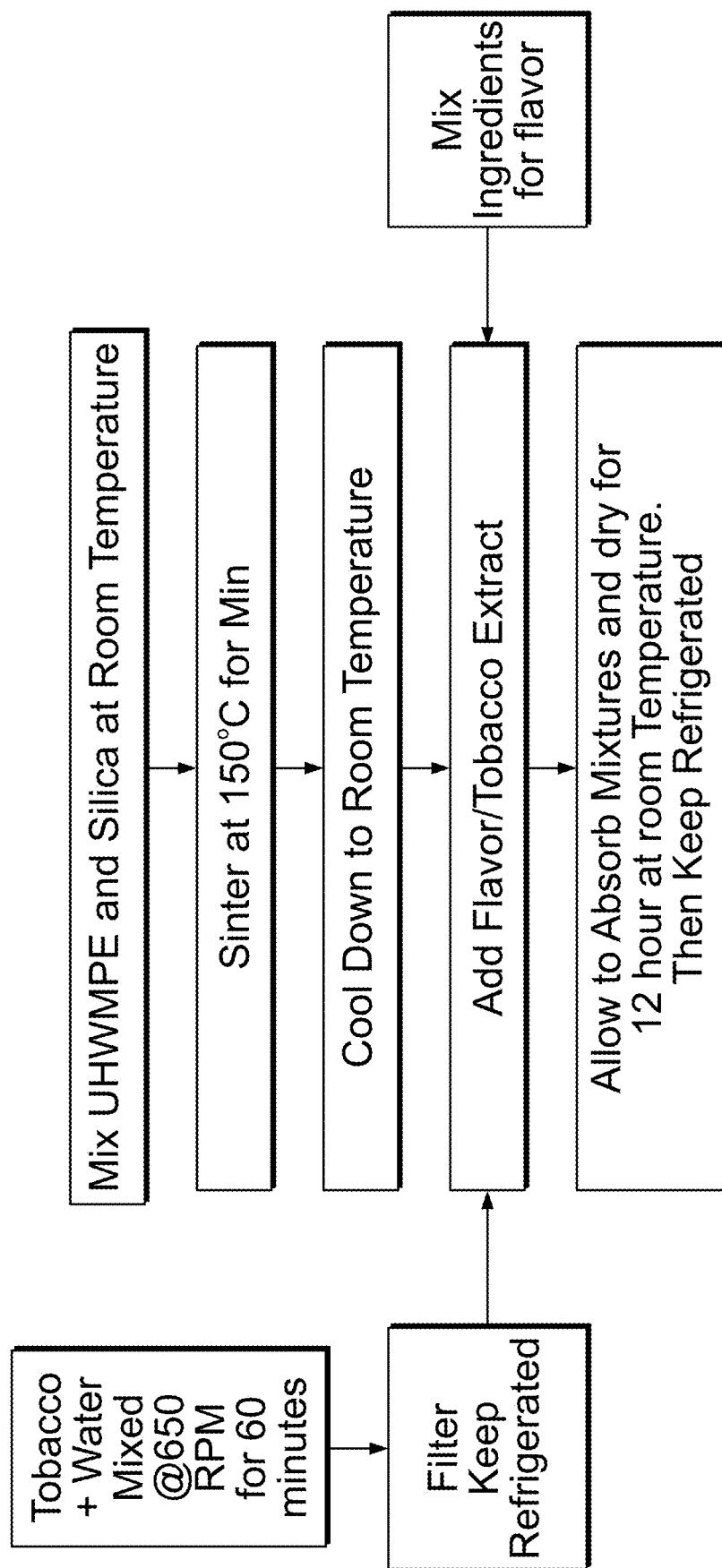
Figure 2E:
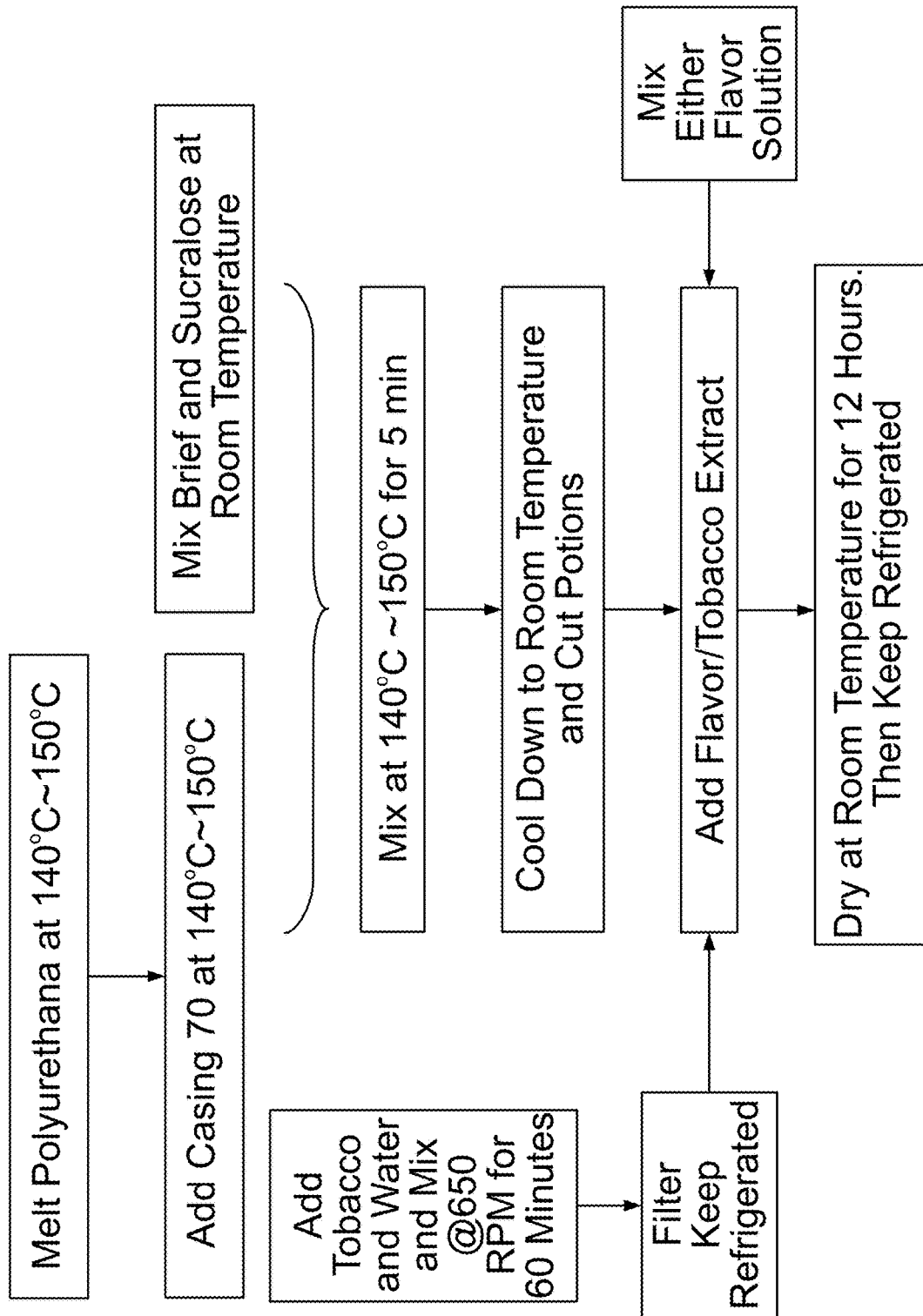

FIG. 2D depicts a method where ultrahigh molecular weight polyethylene (UHWMPE) and silica are sintered and tobacco and flavorants are absorbed into the matrix. FIG. 2E depicts a method where polyurethane and other ingredients are mixed and sintered followed by having tobacco and flavorants absorbed into the matrix.

Figure 3:
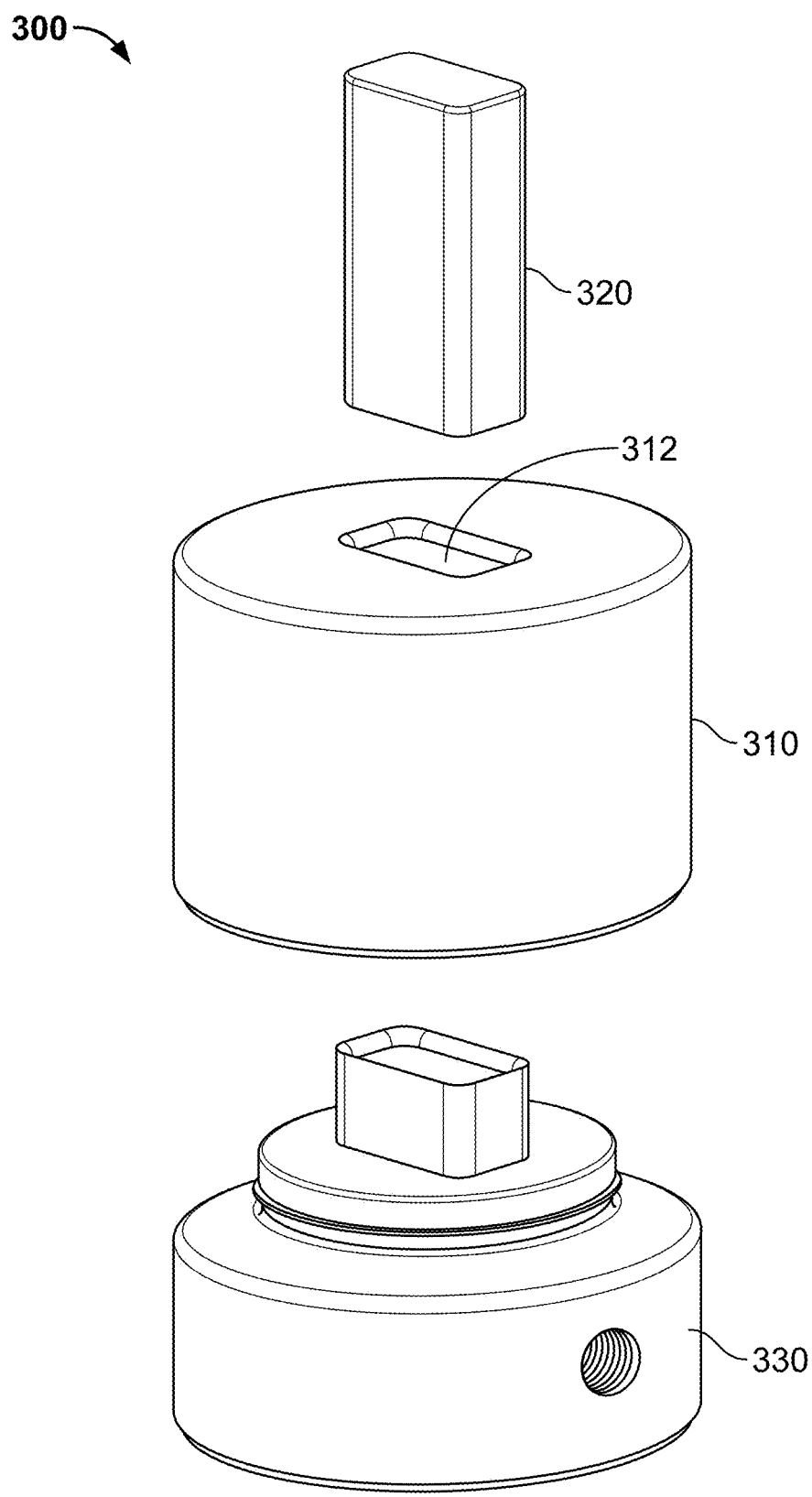
FIG. 3 is a perspective view of a pressing apparatus used to compress a mixture of thermoplastic polymer particles and smokeless tobacco.

FIG. 3 is a perspective view of an exemplary molding apparatus 300, which can be used in the methods provided herein (e.g., in the method of FIG. 2A). The pressing apparatus 300 can have a mold body 310 defining a pressing cavity 312 therein. A bottom of the pressing cavity 312 can be formed by a bottom mold insert part 340, which couples to the mold body 310. The mold body 310 and the bottom mold insert 340 can attach to the mold base 330. The mold base 330 can include apertures to draw a vacuum on in the mold cavity 312. A top mold insert 320 can be used to form the top of the pressing cavity 312 as well as to press a mixture of particles within the mold cavity 312. The bottom mold part 330 can be separated from the mold body 310 to allow for the pressed mixture to be ejected from the mold body 310 by further extending the top mold insert 320.

Smokeless Tobacco Article Shapes and Packaging

FIG. 1 depicts an example of a smokeless tobacco article 100. The smokeless tobacco article 100 has a rectangular shape. Referring now to FIGS. 4A-4D, 5A-5D, 6A, 6B, 7A-7L, and 8A-8J, the smokeless tobacco article 100 can be molded into any desired shape.

Figure 4A:
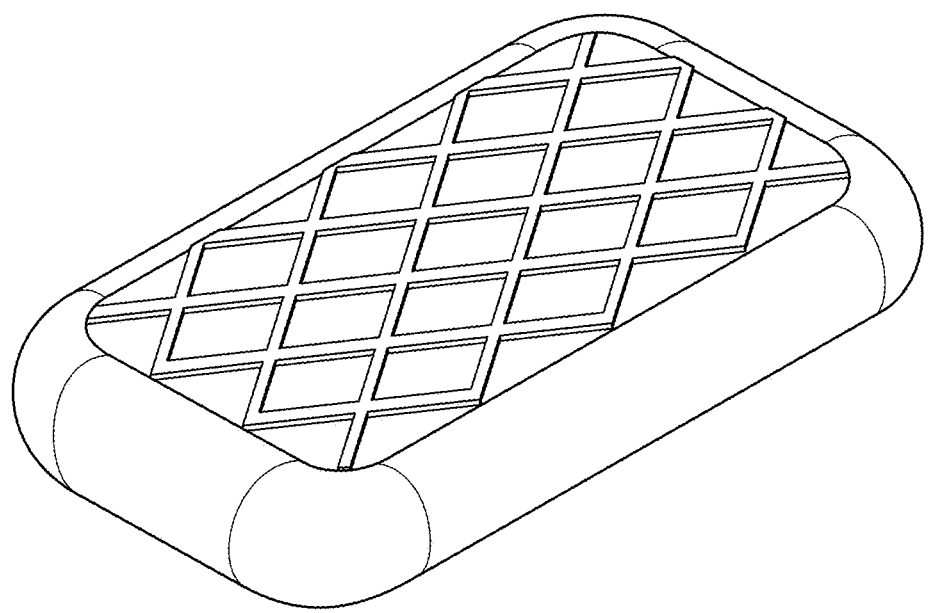
FIGS. 4A-4D illustrate exemplary rounded rectangle shapes of smokeless tobacco articles provided herein.
Figure 4B:
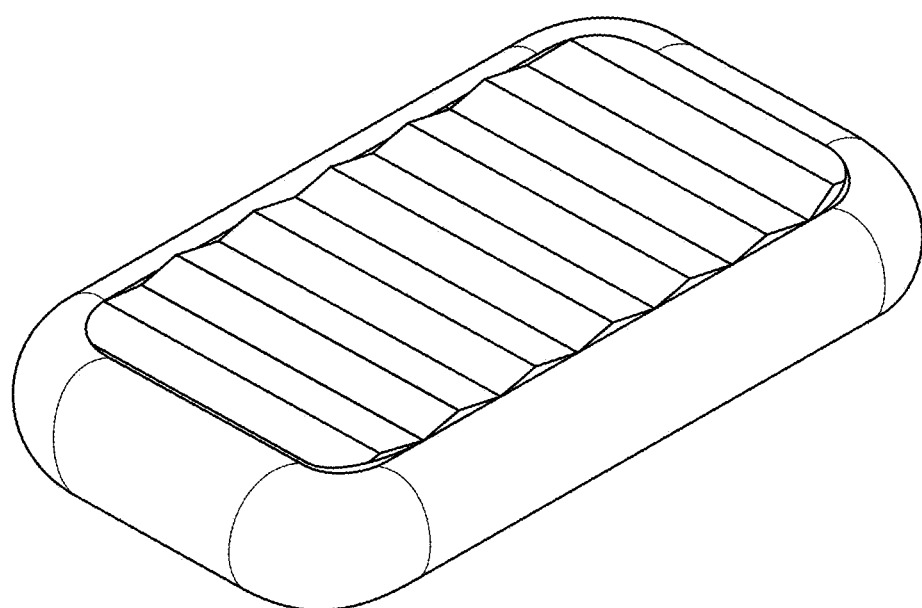
Figure 4C:
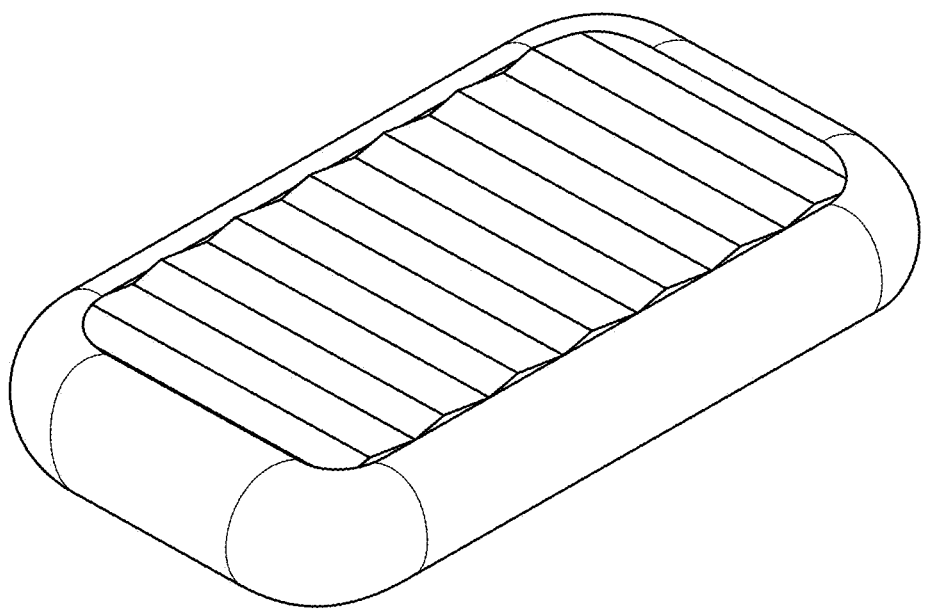
Figure 4D:
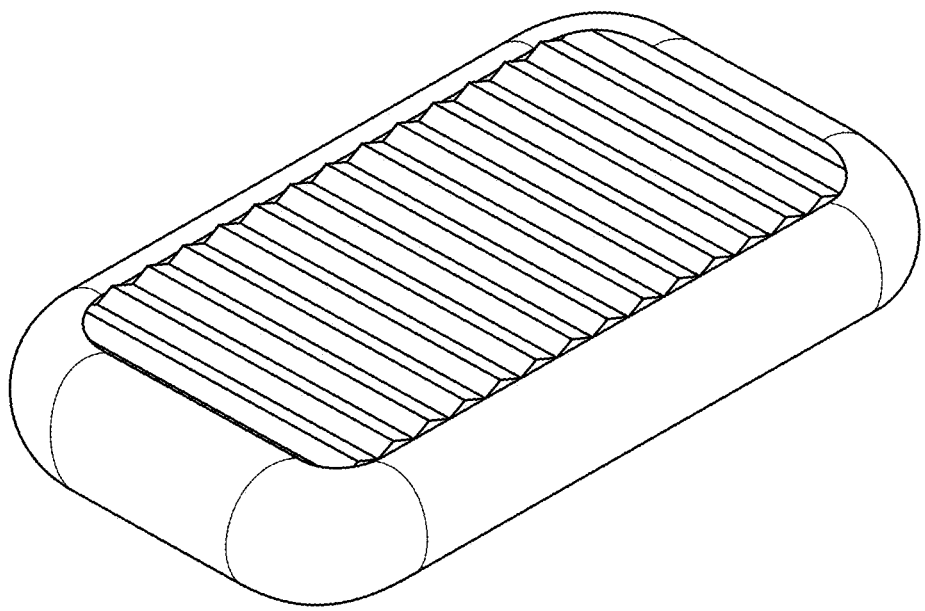
Figure 5A:
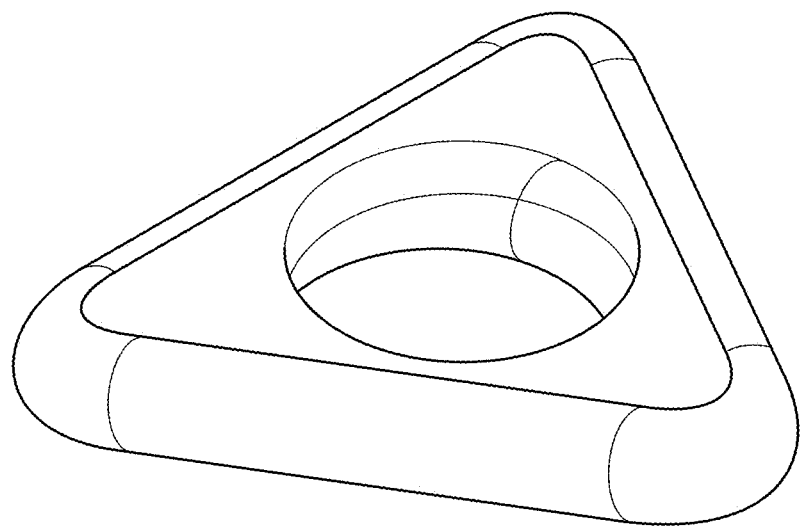
FIGS. 5A-5D illustrate exemplary rounded triangle shapes of smokeless tobacco articles provided herein.
Figure 5B:
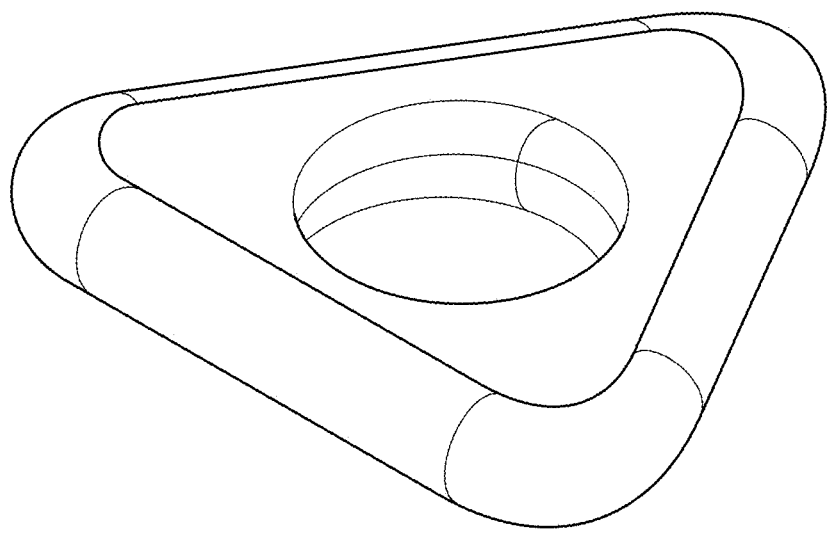
Figure 5C:
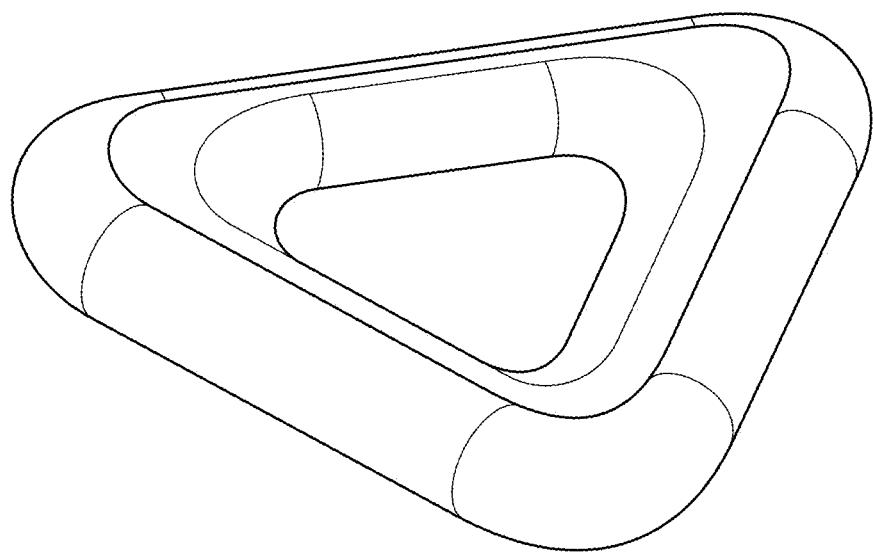
Figure 5D:
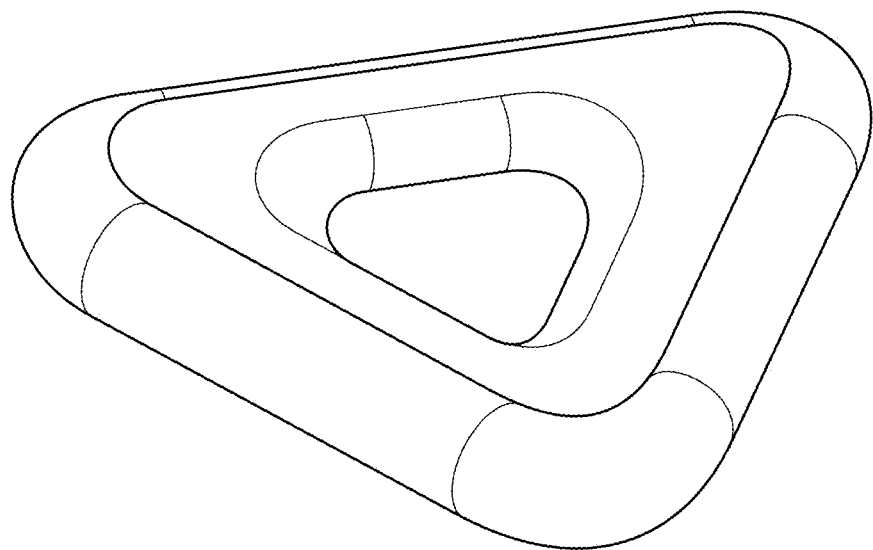

FIGS. 4A-4D depict smokeless tobacco articles having rectangular shapes with rounded corners. As shown in FIGS. 4A-4D, the smokeless tobacco articles provided herein can have textured surfaces. FIG. 4A depicts a raised cross-hatched surface. FIGS. 4B-4D depict smokeless tobacco articles having a serrated texture. These surface textures can be produced during the pressing process and retained during the heating process. The smokeless tobacco articles can be pressed to have any desired texture or a design. For example, a smokeless tobacco article can be pressed with any type of design including, but not limited to, a trademark, a product name, or any type of image.

Figure 6A:
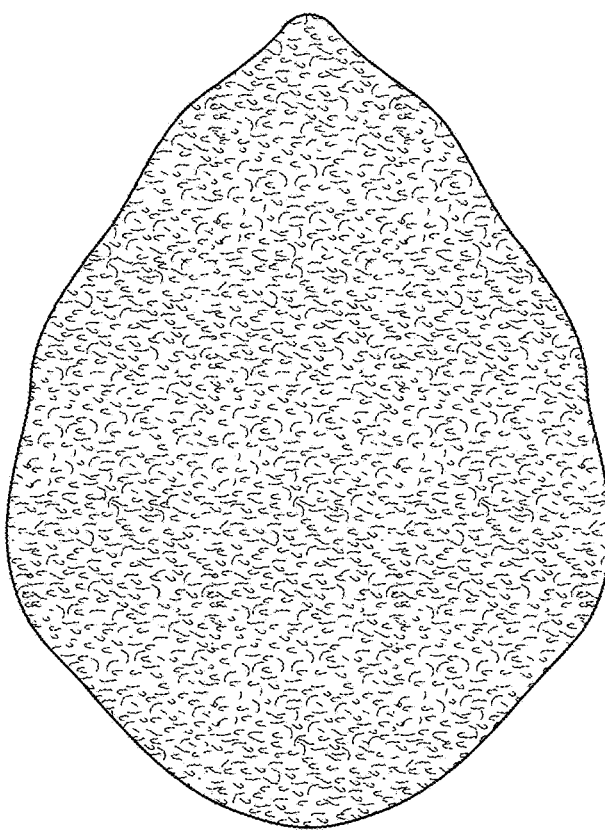
FIGS. 6A-6B and FIGS. 7A-7L illustrate various additional exemplary shapes of smokeless tobacco articles.
Figure 6B:
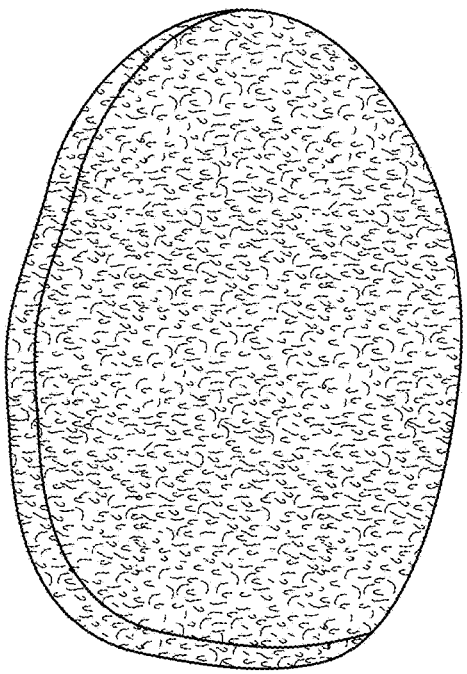
Figure 7A:
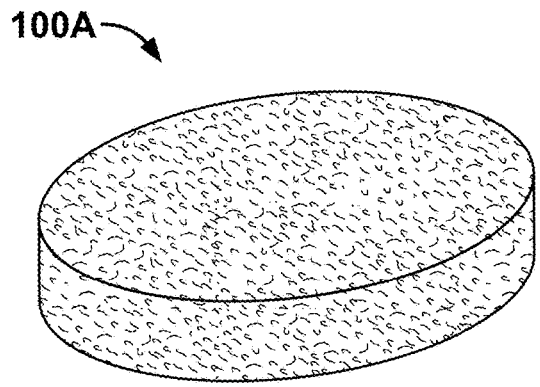
Figure 7B:
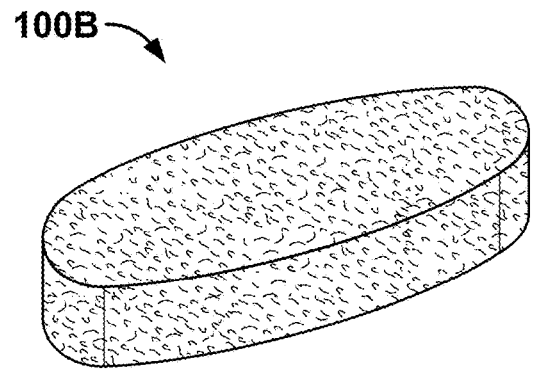
Figure 7C:
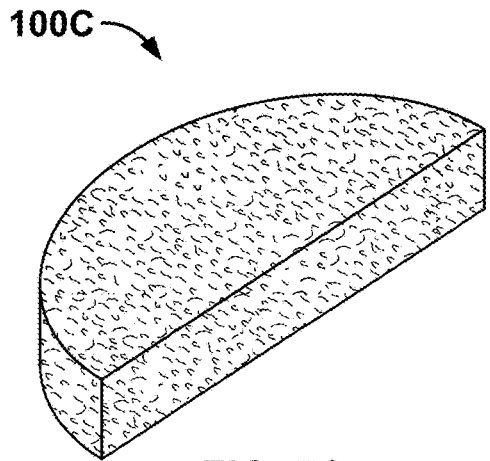
Figure 7D:
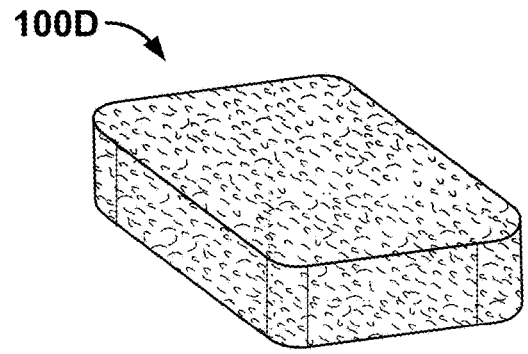
Figure 7E:
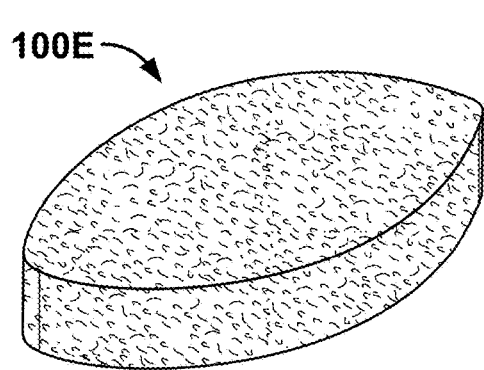
Figure 7F:
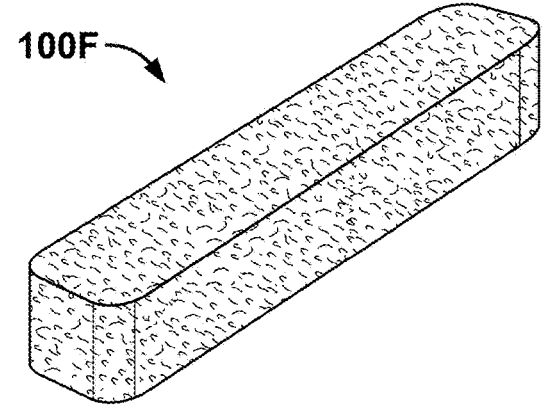
Figure 7G:
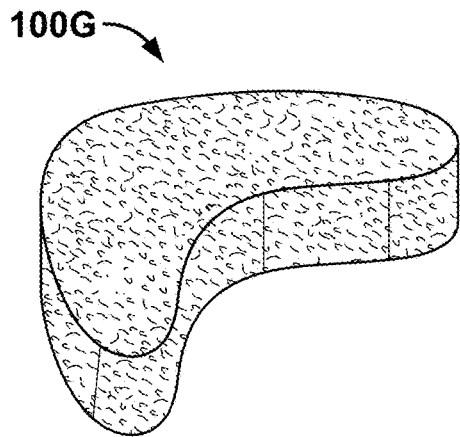
Figure 7H:
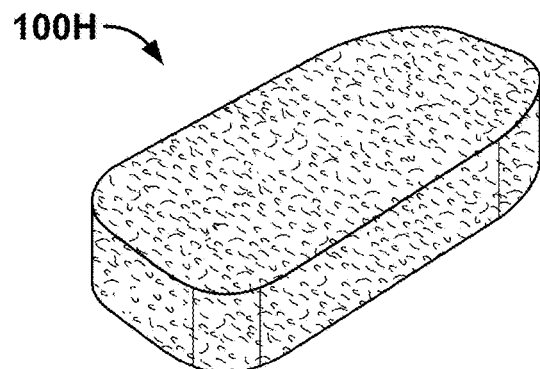
Figure 7I:
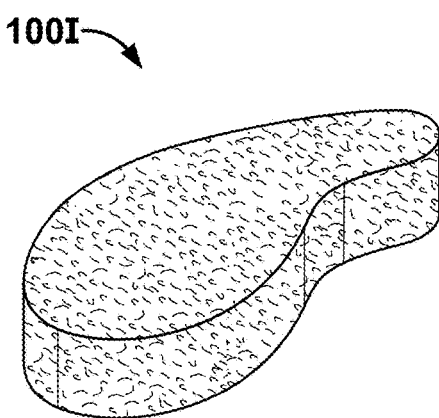
Figure 7J:
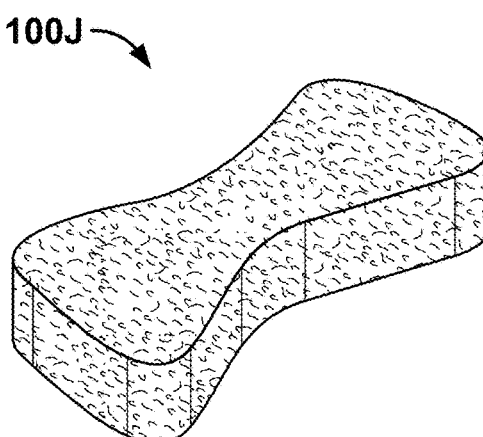
Figure 7K:
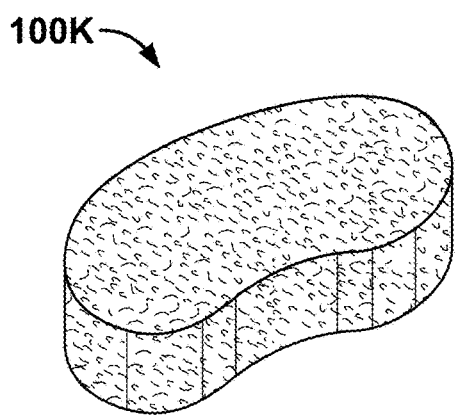
Figure 7L:
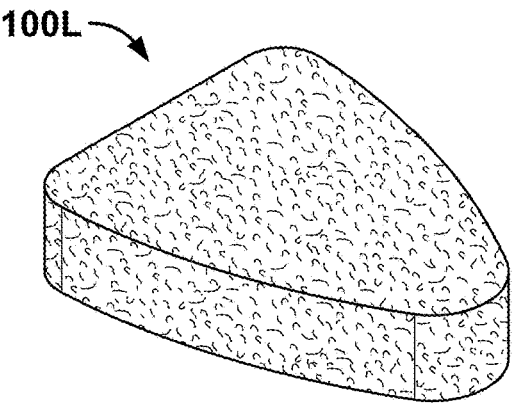

FIGS. 5A-5D depict smokeless tobacco articles having triangular shapes with rounded corners and an orifice. As shown, the orifices in FIGS. 5A-5D can different dimensions. FIG. 6A depicts a leaf shape. FIG. 6B depicts an almond shape.

Referring to FIGS. 7A-7L, the smokeless tobacco article 100A-L can be formed in a shape that promotes improved oral positioning in the oral cavity, improved packaging characteristics, or both. In some circumstances, the smokeless tobacco article 100A-L can be configured to be: (A) an elliptical-shaped smokeless tobacco article 100A; (B) an elongated elliptical-shaped smokeless tobacco article 100B; (C) semi-circular smokeless tobacco article 100C; (D) square or rectangular-shaped smokeless tobacco article 100D; (E) football-shaped smokeless tobacco article 100E; (F) elongated rectangular-shaped smokeless tobacco article 100F; (G) boomerang-shaped smokeless tobacco article 100G; (H) rounded-edge rectangular-shaped smokeless tobacco article 100H; (I) teardrop- or comma-shaped smokeless tobacco article 100I; (J) bowtie-shaped smokeless tobacco article 100J; (K) peanut-shaped smokeless tobacco article 100K; and (L) shield-shaped smokeless tobacco article. Alternatively, the smokeless tobacco article can have different thicknesses or dimensionality, such that a beveled article (e.g., a wedge) is produced or a hemi-spherical shape is produced. In some cases, the smokeless tobacco article has a shield shape.

In addition or in the alternative to flavorants being included within the mouth-stable polymer matrix, flavorants can be included on an exterior of the smokeless tobacco article 100.

In some cases, the smokeless tobacco article 100 or products 100A-O can be wrapped or coated in an edible or dissolvable film, which may be substantially transparent or translucent. The dissolvable film can readily dissipate when the smokeless tobacco article 100 is placed in an oral cavity.

One or more smokeless tobacco articles 100 can be packaged in a variety of conventional and non-conventional manners. For example, a plurality of smokeless tobacco articles 100 can be packaged in a container having a lid. In some cases, a plurality of smokeless tobacco articles 100 can be stacked and packaged in a paper, plastic, and/or aluminum foil tube. The packaging can have a child-resistant lid.

Figure 8A:
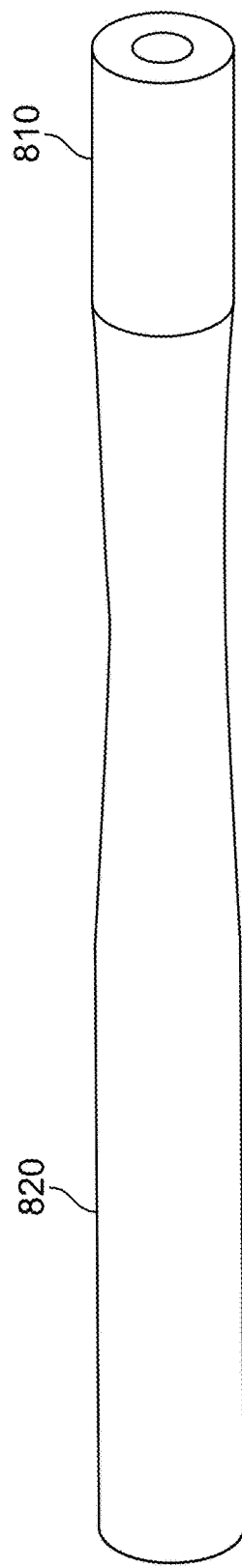
Figure 8B:
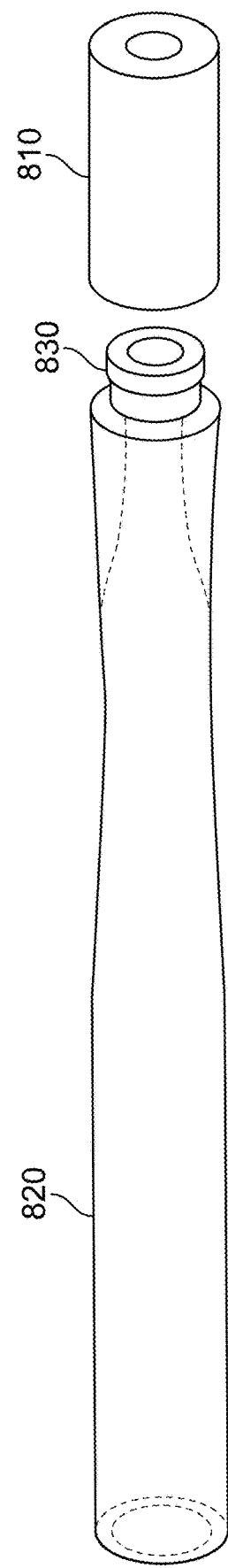

The smokeless tobacco article 100 can also include additional elements. In some cases, a mouth-stable polymer matrix including tobacco fibers can be attached to a rod, tube, or stick. For example, FIGS. 8A-8J illustrate tubes attached to a mouth-stable polymer matrix tips. FIG. 8A depicts an embodiment of a smokeless tobacco article having a tip piece 810 and a tube piece 820. The tip piece 810 can include the mouth-stable polymer matrix having fibers and/or one or more additives within the polymer matrix. The tip piece 810 can be sized and shaped to be at least partially received in an oral cavity. The tube piece 820 can be made of any conventional polymer. During use the tube piece 820 can act as holder for the tip piece 810. The tube piece 820 and the tip piece 810 can be attached by a snap-fit attachment feature 830, as shown in FIG. 8B.

Figure 8C:
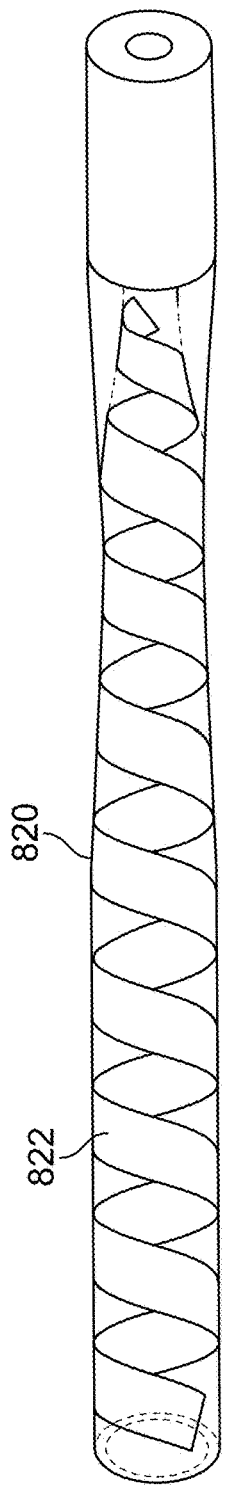
Figure 8D:
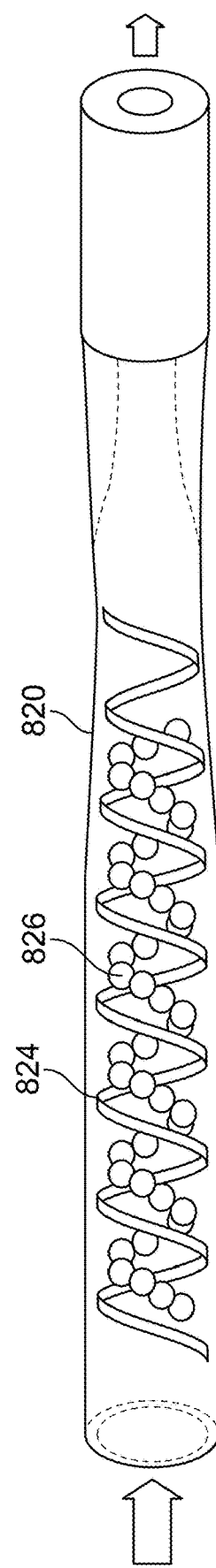

The tube piece 820 can be reusable. For example, multiple tip pieces 810 can be packaged with a single tube piece 320 and a user can switch off the tip pieces 810. In some cases, the tube pieces 820 can be intended for a single use. In some cases, the tube pieces 820 can include flavorants within the tube. The flavorants can be adapted to be released when air is drawn through the tube 820. For example, FIG. 8C depicts a tube including a flavor ribbon 822. FIG. 8D depicts a tube 820 including a flavor strip 824 and a plurality of flavor beads 826. FIG. 8E depicts a tube 320 including a compressed mass 828 of flavor beads 826. In some cases, the inside of the tube can have structure adapted to alter the flow pattern of air drawn into the tube. For example, FIG. 8F depicts a tube 820F having a series of steps and constrictions 840 adapted to alter the flow pattern of air drawn into the tube. FIG. 8F also depicts an alternative connection feature 830F.

Figure 8G:
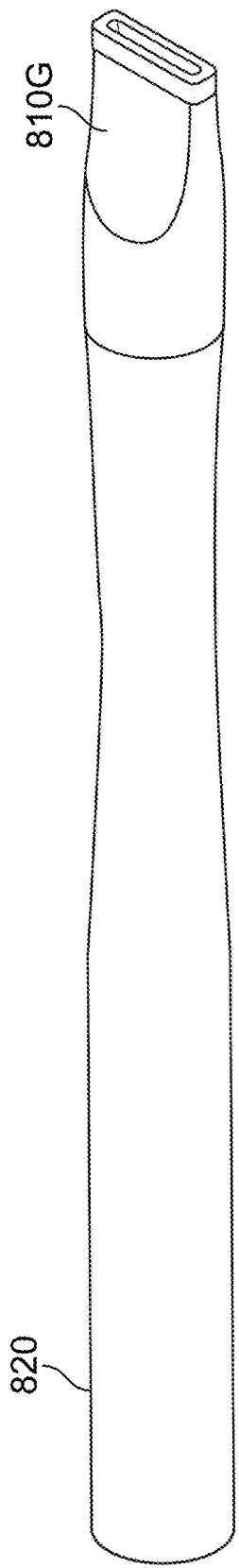

FIG. 8G depicts an embodiment having a recorder-like shape. As shown, a tip piece 810G is connected to the contoured tube piece 820. For example, the recorder-shaped tip 310G can be composed of a mouth-stable polymer matrix that includes tobacco fibers, one or more sweeteners, and one or more flavorants. As shown, the tip piece 810G is sized and shaped to be at least partially received within an oral cavity of an adult tobacco consumer.

Figure 8H:
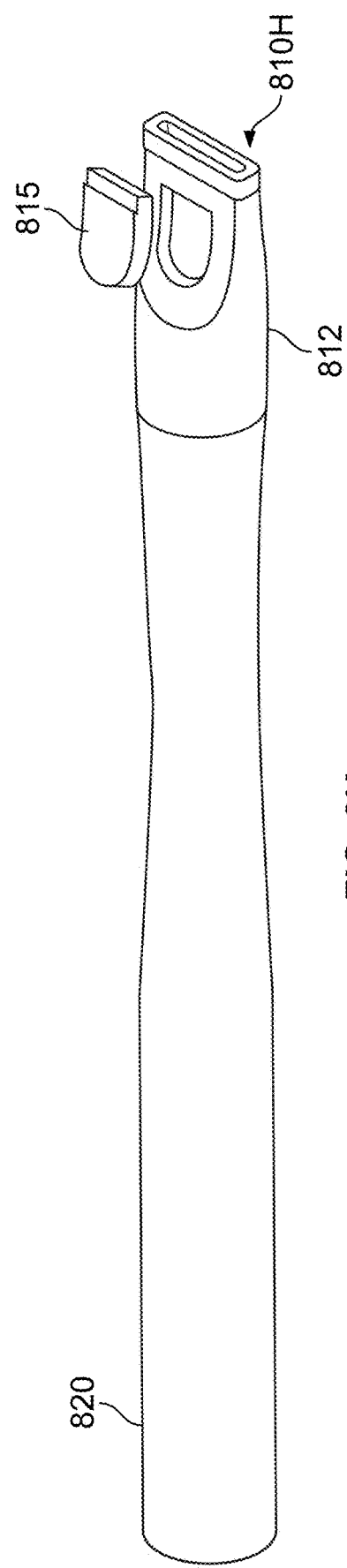
Figure 8I:
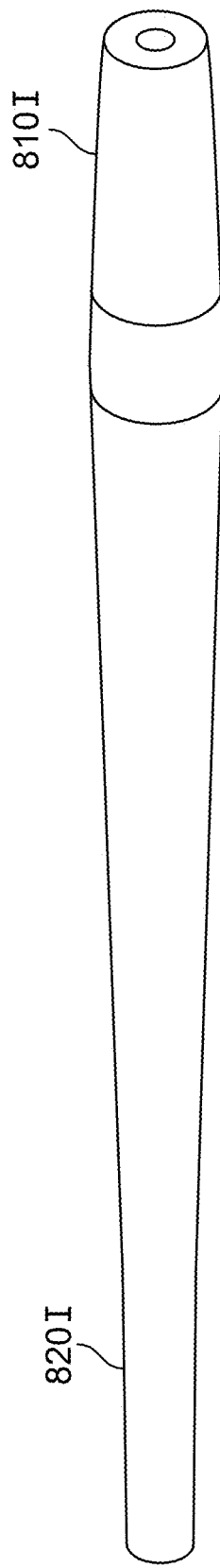
Figure 8J:
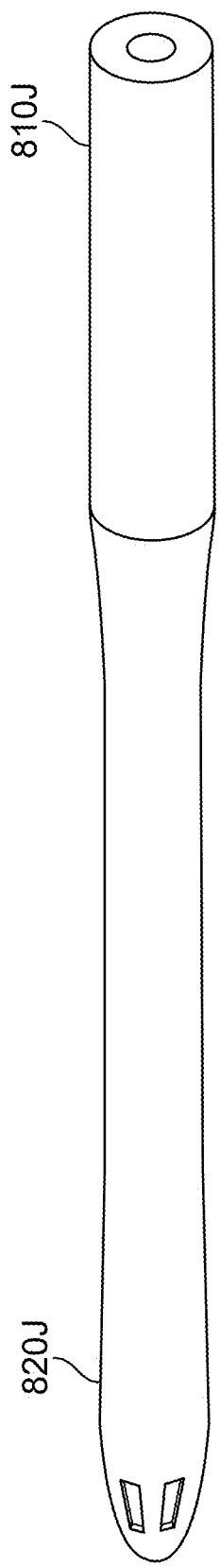

FIG. 8H depicts a similarly shaped smokeless tobacco article having a plastic recorder-shaped tip 810H that includes a reusable plastic part 812 and a mouth-stable polymer matrix part 315 having tobacco fibers dispersed therein. FIGS. 8I and 8J depict embodiments having alternatively shaped tip pieces 810I and 810J. FIG. 31 depicts an embodiment having a tapered tube 820I. FIG. 8J depicts an embodiment having vent holes at the non-tip end of the tube piece 820J.

In some cases, a system or kit of different tubes and rods and/or different tips can be packaged together, each having the same type of attachment features. Embodiments having each of the combinations of tips and tubes or rods shown in FIGS. 8A-8J are contemplated.

Smokeless Tobacco Article Properties

The smokeless tobacco article 100 can provide a favorable tactile experience (e.g., mouth feel). The smokeless tobacco article 100 can also retain its shape during processing, shipping, handling, and optionally use. As noted above, the smokeless tobacco article 100 includes a mouth-stable polymer matrix that does not appreciably dissolve or disintegrate when placed in an oral cavity and exposed to saliva. In some cases, the smokeless tobacco article 100 can have an elasticity allowing an adult tobacco consumer to work the product within the mouth. In some cases, the smokeless tobacco article 100 has at least some shape memory and thus can return to shape after being squeezed between teeth in an oral cavity. Working of the smokeless tobacco article 100 within the oral cavity can accelerate the release of the tobacco constituents, additives, sweeteners, and/or flavorants within the mouth-stable polymer matrix.

During use, the smokeless tobacco article 100 can absorb saliva into the polymer matrix and provide access to the tobacco in the polymer matrix. Physical activity, such as chewing of the smokeless tobacco article in the mouth, can also accelerate the release of tobacco, tobacco constituents, flavors, and/or other additives in the smokeless tobacco product. As the smokeless tobacco article is chewed, saliva can access different sections of the polymer-fiber matrix. The smokeless tobacco article 100 can be chewed without significant and instantaneous permanent plastic deformation. As the product is chewed, it can become more pliable and additional additives can become available for release into the oral cavity. Some embodiments of the smokeless tobacco article 100 can be adapted to remain non-sticky during and after use. After prolonged use, certain embodiments of the smokeless tobacco article 100 will expand and become flatter. The smokeless tobacco article, however, can retain the essence of its original shape. The amount of deformation will depend on the duration of use and an amount of mouth force used. As the product is used, it can increase in both weight and volume, due to the swelling of the porous matrix with saliva. With greater the physical manipulation, the smokeless tobacco article 100 will have a greater amount of swelling and thus have a larger weight gain. In certain embodiments, the smokeless tobacco article 100 will having an increase in weight of between 4 and 75 percent when chewed by an adult consumer for 30 minutes.

Figure 9:
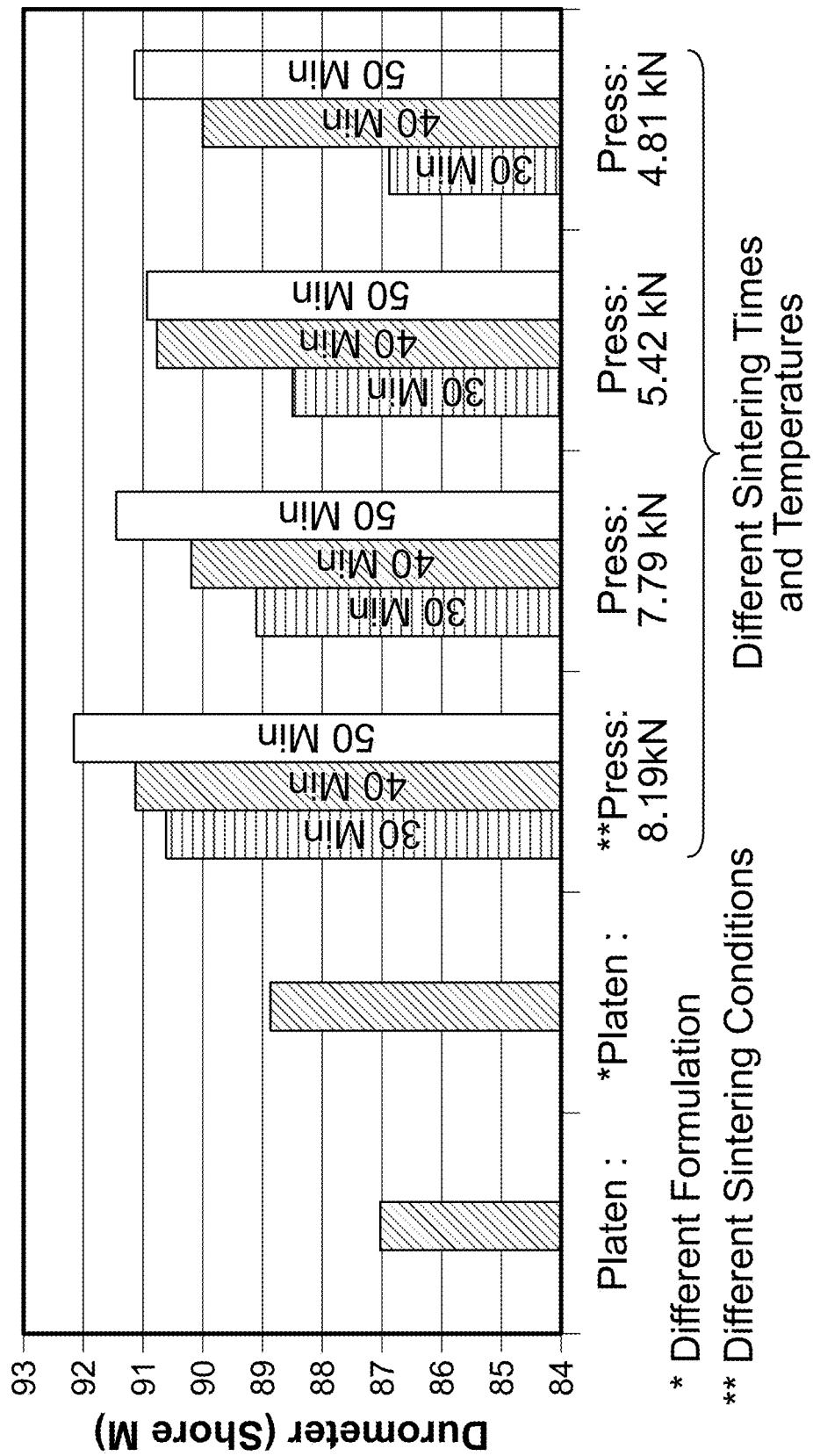
FIG. 9 is a chart depicting the Shore M hardness of various exemplary pieces.

Referring to FIG. 9, the smokeless tobacco articles provided herein can have a Shore M harness of at least 85, a Shore M hardness of at least 86, a Shore M hardness of at least 88, a Shore M hardness of at least 89, a Shore M hardness of at least 90, a Shore M hardness of at least 91, or a Shore M hardness of at least 92. With increased heating times and temperatures, the Shore M hardness can be increased, as shown by the progressively larger bars. As shown, the Shore M hardness also increases with increased pressure during the pressing process. These pieces were sintered at 30, 40, and 50 minutes at 150° C. Longer sintering time yielded higher durometers. Formulation was 2 parts 180 um particle size UHMWPE to 1 part 400 mesh tobacco by weight.

The smokeless tobacco article 100 can have a variety of colors. In some cases, natural and artificial coloring can be added to the mouth-stable polymer before the polymer is formed into particles to form smokeless tobacco articles 100 having a predetermined color. Encapsulated flavors can be added prior to the pressing process to create speckles, patterns or dots within the smokeless tobacco article.

Tobacco

By "tobacco" it is meant a part, e.g., leaves, and stems, of a member of the genus *Nicotiana* that cut, shredded, or otherwise processed to form fibers of tobacco plant tissue. Exemplary species of tobacco include *N. rustica, N. tabacum, N. tomentosiformis*, and *N. sylvestris*. For example, the tobacco particles can be made by comminuting tobacco stems. The tobacco particles can include cellulose, lignin, lipids, hemicellulose, and other tobacco constitutents.

Suitable tobaccos include fermented and unfermented tobaccos. In addition to fermentation, the tobacco can be processed using other techniques. For example, tobacco can be processed by heat treatment (e.g., cooking, toasting), flavoring, enzyme treatment, expansion and/or curing. Both fermented and non-fermented tobaccos can be processed using these techniques. In some cases, the tobacco can be unprocessed tobacco. Specific examples of suitable processed tobaccos include dark air-cured, dark fire-cured, burley, flue cured, and cigar filler or wrapper, as well as the products from the whole leaf stemming operation. In some cases, the tobacco can include up to 70% dark tobacco on a fresh weight basis.

Tobacco can be conditioned by heating, sweating and/or pasteurizing steps as described in U.S. Publication Nos. 2004/0118422 or 2005/0178398. Fermenting typically is characterized by high initial moisture content, heat generation, and a 10 to 20% loss of dry weight. See, e.g., U.S. Pat. Nos. 4,528,993; 4,660,577; 4,848,373; and 5,372,149. In addition to modifying the aroma of the leaf, fermentation can change either or both the color and texture of a leaf. Also during the fermentation process, evolution gases can be produced, oxygen can be taken up, the pH can change, and the amount of water retained can change. See, for example, U.S. Publication No. 2005/0178398 and Tso (1999, Chapter 1 in Tobacco, Production, Chemistry and Technology, Davis & Nielsen, eds., Blackwell Publishing, Oxford). Cured, or cured and fermented tobacco can be further processed (e.g., cut, expanded, blended, milled or comminuted) prior to incorporation into the smokeless tobacco article. The tobacco can be long cut fermented cured moist tobacco having an oven volatiles content of between 48 and 50 weight percent prior to mixing with the mouth-stable polymer and optionally flavorants and other additives.

The tobacco can be prepared from plants having less than 20 µg of DVT per $cm^2$ of green leaf tissue. For example, the tobacco can be selected from the tobaccos described in U.S. Patent Publication No. 2008/0209586, which is hereby incorporated by reference. Tobacco compositions containing tobacco from such low-DVT varieties exhibits improved flavor characteristics in sensory panel evaluations when compared to tobacco or tobacco compositions that do not have reduced levels of DVTs.

Green leaf tobacco can be cured using conventional means, e.g., flue-cured, barn-cured, fire-cured, air-cured or sun-cured. See, for example, Tso (1999, Chapter 1 in Tobacco, Production, Chemistry and Technology, Davis & Nielsen, eds., Blackwell Publishing, Oxford) for a description of different types of curing methods. Cured tobacco is usually aged in a wooden drum (i.e., a hogshead) or cardboard cartons in compressed conditions for several years (e.g., two to five years), at a moisture content ranging from 10% to about 25%. See, U.S. Pat. Nos. 4,516,590 and 5,372,149. Cured and aged tobacco then can be further processed. Further processing includes conditioning the tobacco under vacuum with or without the introduction of steam at various temperatures, pasteurization, and fermentation. Fermentation typically is characterized by high initial moisture content, heat generation, and a 10 to 20% loss of dry weight. See, e.g., U.S. Pat. Nos. 4,528,993; 4,660,577; 4,848,373; 5,372,149; U.S. Publication No. 2005/0178398; and Tso (1999, Chapter 1 in Tobacco, Production, Chemistry and Technology, Davis & Nielsen, eds., Blackwell Publishing, Oxford). Cure, aged, and fermented tobacco can be further processed (e.g., cut, shredded, expanded, or blended). See, for example, U.S. Pat. Nos. 4,528,993; 4,660, 577; and 4,987,907.

The tobacco can be processed to a desired size. In certain embodiments, the tobacco fiber can be processed to have an average fiber size of less than 200 micrometers. In particular embodiments, the fibers are between 75 and 125 micrometers. In some cases, the fibers are processed to have a size of 75 micrometers or less. In some cases, the tobacco includes long cut tobacco, which can be cut or shredded into widths of about 10 cuts/inch up to about 110 cuts/inch and lengths of about 0.1 inches up to about 1 inch. Double cut tobacco can have a range of particle sizes such that about 70% of the double cut tobacco falls between the mesh sizes of −20 mesh and 80 mesh.

The tobacco can have a total oven volatiles content of about 10% by weight or greater; about 20% by weight or greater; about 40% by weight or greater; about 15% by weight to about 25% by weight; about 20% by weight to about 30% by weight; about 30% by weight to about 50% by weight; about 45% by weight to about 65% by weight; or about 50% by weight to about 60% by weight. Those of skill in the art will appreciate that "moist" tobacco typically refers to tobacco that has an oven volatiles content of between about 40% by weight and about 60% by weight (e.g., about 45% by weight to about 55% by weight, or about 50% by weight). As used herein, "oven volatiles" are determined by calculating the percentage of weight loss for a sample after drying the sample in a pre-warmed forced draft oven at 110° C. for 3.25 hours. The smokeless tobacco article can have different overall oven volatiles contents than the oven volatiles contents of the tobacco used to make the smokeless tobacco article. The processing steps described herein can reduce or increase the oven volatiles content.

In some cases, the tobacco can be processed to include flavor components prior to construction of a molded article. Such "primary" flavor components can be added, for example, by spraying tobacco with a flavor extract prior to combining the tobacco with a thermoplastic polymer and forming the smokeless tobacco article. In another example, flavor can be imparted to tobacco by combining solid or liquid flavor agents with a tobacco material and incubating under suitable conditions, as described, for example, in previously incorporated application Ser. No. 10/982,248. Alternatively or in addition, a smokeless tobacco article can be further processed to add one or more "secondary" flavor components via capillary action, injection, or other introduction means, such that the flavor components are added after construction of the article. In such embodiments, smokeless tobacco articles could be flavored in accordance with customer orders, resulting in increased control of inventory, for example. In some cases, flavor can be added after the article is formed by placing the article under a vacuum and subsequently filling the article with a flavor by placing a flavor in the vacuum chamber.

Flavor can be provided by synthesized flavors, flavor extracts, plant matter, or a combination thereof. Suitable flavors and flavor extracts include, without limitation, menthol, cinnamon, wintergreen, cherry, berry, peach, apple, spearmint, peppermint, bergamot, vanilla, coffee, mint oil from species of the genus Mentha, or other desired flavors. Flavors can also be provided by plant matter, e.g., mint leaves, which typically are 10% flavor oils and 90% insoluble fiber. Suitable plant matter can be obtained from plants such as clove, cinnamon, herb, cherry, peach, apple, lavender, rose, vanilla, lemon, orange, coffee, or species of the genus Mentha. As further provided herein, flavor can also be provided by imitation, synthetic, or artificial flavor ingredients and blends containing such ingredients. Suitable sweeteners include, for example, sucralose, acesulfame potassium (Ace-K), aspartame, saccharine, cyclamates, lactose, sucrose, glucose, fructose, sorbitol, and mannitol. Liquid smoke or other heat activated flavorants also can be added to provide additional flavor.

Additives

A variety of additives can be included in the smokeless tobacco article 100. The additives can include alkaloids (e.g., nicotine), minerals, vitamins, dietary supplements, nutraceuticals, energizing agents, soothing agents, coloring agents, amino acids, chemesthic agent, antioxidants, food grade emulsifiers, pH modifiers, botanicals (e.g., green tea), teeth whitening (e.g., SHRIMP), therapeutic agents, sweeteners, flavorants, and combinations thereof. In certain embodiments, the additives include nicotine, sweeteners, and/or flavorants.

The smokeless tobacco article 100 may optionally include other additives. For example, these additives can include non-nicotine alkaloids, vitamins, dietary minerals, other dietary supplements, and/or therapeutic agents. For example, suitable vitamins include vitamins A, B1, B2, B6, C, D2, D3, E, F, K, and P. For example, a smokeless tobacco article 100 can include C-vitamins. Suitable dietary minerals include calcium (as carbonate, citrate, etc.) or magnesium (as oxide, etc.), chromium (usually as picolinate), and iron (as bis-glycinate). One or more dietary minerals could be included in a smokeless tobacco article with or without the use of other additives. Other dietary supplements and/or therapeutic agents can also be included as additives. The smokeless tobacco article 100 can also include fillers such as starch, di-calcium phosphate, lactose, sorbitol, mannitol, and microcrystalline cellulose, calcium carbonate, dicalcium phosphate, calcium sulfate, clays, silica, glass particles, sodium lauryl sulfate (SLS), glyceryl palmitostearate, sodium benzoate, sodium stearyl fumarate, talc, and stearates (e.g., Mg or K), and waxes (e.g., glycerol monostearate, propylene glycol monostearate, and acetylated monoglycerides), stabilizers (e.g., ascorbic acid and monosterol citrate, BHT, or BHA), disintegrating agents (e.g., starch, sodium starch glycolate, cross caramellose, cross linked PVP), pH stabilizers, or preservatives. In some cases, the amount of filler in the smokeless tobacco article 100 is limited to less than 10 weight percent in sum. In some cases, the amount of filler in the smokeless tobacco article 100 is limited to be less than 5 weight percent in sum. In some cases, the fillers are mouth stable. In some cases, the fillers can dissolve or disintegrate during use and thus result in a smokeless tobacco article that becomes more pliable during use.

Other Embodiments

It is to be understood that, while the invention has been described herein in conjunction with a number of different aspects, the foregoing description of the various aspects is intended to illustrate and not limit the scope of the invention, which is defined by the scope of the appended claims. For example, the mixture of particles can be selectively heated with a laser. Other aspects, advantages, and modifications are within the scope of the following claims.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset or combination of these is also specifically contemplated and disclosed.

We claim:

1. A method of making an oral product comprising:
   compressing thermoplastic polymer particles within a pressing apparatus to form the thermoplastic polymer particles into a desired shape;
   releasing pressure on the thermoplastic polymer particles, the thermoplastic polymer particles being configured to retain the desired shape;
   heating the thermoplastic polymer particles to at least partially melt at least a portion of the thermoplastic polymer particles to form a porous matrix, the heating configured to provide the porous matrix with a shore M hardness of at least 85; and
   absorbing a tobacco extract into the porous matrix to form an oral product.

2. The method of claim 1, further comprising:
   removing the desired shape from the pressing apparatus prior to the heating.

3. The method of claim 1, wherein the heating is performed at atmospheric pressure.

4. The method of claim 1, wherein the compressing is performed at a temperature ranging from 20° C. to 25° C.

5. The method of claim 1, wherein the compressing is performed at a force of at least 1 kN.

6. The method of claim 5, wherein the force is at least 6 kN.

7. The method of claim 6, wherein the force is at least 8 kN.

8. The method of claim 1, wherein the shore M hardness is at least 90.

9. The method of claim 1, wherein the heating is performed in a convection oven.

10. The method of claim 1, wherein the heating is performed at a temperature of less than 20° C. greater than a melting temperature of a thermoplastic polymer of the thermoplastic polymer particles.

11. The method of claim 1, wherein the thermoplastic polymer particles include polyethylene.

12. The method of claim 1, wherein the thermoplastic polymer particles include ultra-high molecular weight polyethylene.

13. The method of claim 1, wherein the thermoplastic polymer particles have an average diameter ranging from 10 microns to 230 microns.

14. The method of claim 13, wherein the average diameter ranges from 10 microns to 20 microns.

15. The method of claim 1, further comprising:
    adding a flavorant to the oral product.

16. The method of claim 15, wherein the adding includes absorbing the flavorant into the porous matrix together with the tobacco extract.

17. The method of claim 1, further comprising:
    prior to the compressing, mixing the thermoplastic polymer particles with a filler.

18. The method of claim 17, wherein
    the thermoplastic polymer particles include ultra-high molecular weight polyethylene, and
    the filler includes silica.

19. The method of claim 1, wherein the absorbing is performed at a temperature ranging from 20° C. to 25° C.

20. The method of claim 1, further comprising:
    mixing the thermoplastic polymer particles with a sweetener.

* * * * *